US009242897B2

(12) United States Patent
Lai et al.

(10) Patent No.: US 9,242,897 B2
(45) Date of Patent: Jan. 26, 2016

(54) AQUEOUS DISPERSIONS AND METHODS OF MAKING SAME

(75) Inventors: Xiaoyun Lai, Gastonia, NC (US); Richard J. Pavlekovsky, Ford City, PA (US); Matthew E. Wehrle, Apollo, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 12/782,278

(22) Filed: May 18, 2010

(65) Prior Publication Data

US 2010/0311872 A1  Dec. 9, 2010

Related U.S. Application Data

(60) Provisional application No. 61/179,138, filed on May 18, 2009.

(51) Int. Cl.
| | |
|---|---|
| C08K 3/04 | (2006.01) |
| C08L 39/06 | (2006.01) |
| C08L 63/00 | (2006.01) |
| C08L 75/04 | (2006.01) |
| C03C 25/10 | (2006.01) |
| C03C 25/44 | (2006.01) |
| C08J 3/07 | (2006.01) |
| H01B 1/24 | (2006.01) |

(52) U.S. Cl.
CPC ............... *C03C 25/101* (2013.01); *C03C 25/44* (2013.01); *C08J 3/07* (2013.01); *H01B 1/24* (2013.01); *C08J 2339/06* (2013.01); *C08J 2363/00* (2013.01); *C08J 2375/04* (2013.01); *Y10T 428/249948* (2015.04); *Y10T 428/292* (2015.01)

(58) Field of Classification Search
None
See application file for complete search history.

(56) References Cited

U.S. PATENT DOCUMENTS

| | | | |
|---|---|---|---|
| 3,247,020 A | 4/1966 | Shulver et al. | |
| 3,269,883 A | 8/1966 | Shulver et al. | |
| 3,416,990 A | 12/1968 | Robinson, Jr. | |
| 3,437,550 A | 4/1969 | Paul, Jr. | |
| 3,483,276 A | 12/1969 | Mahlman | |
| 4,090,984 A | 5/1978 | Lin et al. | |
| 4,209,425 A | 6/1980 | Lin et al. | |
| 4,330,811 A | 5/1982 | Bordner | |
| 5,130,197 A | 7/1992 | Temple | |
| 6,734,262 B2 | 5/2004 | Patel | |
| 6,783,746 B1 * | 8/2004 | Zhang et al. | 423/447.1 |
| 7,014,794 B1 | 3/2006 | Olinga et al. | |
| 7,078,098 B1 | 7/2006 | Woodside et al. | |
| 7,192,642 B2 | 3/2007 | Veedu et al. | |
| 7,282,260 B2 | 10/2007 | LeGrande et al. | |
| 7,811,542 B1 | 10/2010 | McElrath et al. | |
| 2006/0052509 A1 * | 3/2006 | Saitoh | 524/496 |
| 2006/0237688 A1 | 10/2006 | Zimmermann | |
| 2006/0280938 A1 | 12/2006 | Atkinson | |
| 2007/0079730 A1 | 4/2007 | Puckett et al. | |
| 2007/0128960 A1 | 6/2007 | Ghasemi Nejhad et al. | |
| 2007/0292622 A1 | 12/2007 | Rowley et al. | |
| 2008/0075954 A1 | 3/2008 | Wardle et al. | |
| 2008/0118728 A1 | 5/2008 | Magley et al. | |
| 2008/0123560 A1 | 5/2008 | Nassor et al. | |
| 2008/0213498 A1 | 9/2008 | Drzal et al. | |
| 2008/0213560 A1 | 9/2008 | Moireau et al. | |
| 2008/0241533 A1 | 10/2008 | Dijt et al. | |
| 2009/0126412 A1 | 5/2009 | Pollet et al. | |
| 2009/0202764 A1 | 8/2009 | Tonon et al. | |
| 2009/0239056 A1 | 9/2009 | Moireau et al. | |
| 2010/0006442 A1 * | 1/2010 | Lochtman et al. | 205/50 |
| 2010/0203328 A1 | 8/2010 | Hochstetter et al. | |
| 2010/0215948 A1 | 8/2010 | Kissounko et al. | |
| 2010/0222480 A1 | 9/2010 | Christiansen et al. | |
| 2010/0260998 A1 | 10/2010 | Waicukausi et al. | |
| 2010/0310851 A1 | 12/2010 | Lai et al. | |
| 2010/0311872 A1 | 12/2010 | Lai et al. | |
| 2011/0017957 A1 | 1/2011 | Gaillard et al. | |

FOREIGN PATENT DOCUMENTS

| | | | | |
|---|---|---|---|---|
| DE | 10 2005 048190 | 4/2007 | | |
| DE | 10 2005 049428 | 6/2007 | | |
| DE | 10 2006 048920 | 5/2008 | | |
| DE | 10 2007 010540 | 9/2008 | | |
| JP | 2008 231426 | 10/2008 | | |
| WO | WO 02/02686 | 1/2002 | | |
| WO | WO 03107359 A1 * | 12/2003 | ............... | H01B 1/18 |
| WO | WO 2005/077854 | 8/2005 | | |
| WO | WO 2006/043011 | 4/2006 | | |
| WO | WO 2007/149109 | 12/2007 | | |
| WO | WO 2008/002317 | 1/2008 | | |
| WO | WO 2008015168 A1 * | 2/2008 | ............... | C25D 5/56 |
| WO | WO 2009/071812 | 6/2009 | | |

OTHER PUBLICATIONS

United States Patent and Trademark Office, Office Action, U.S. Appl. No. 12/782,368, mailed May 20, 2011.
Patent Cooperation Treaty, International Search report, International Application No. PCT/US2010/035271, mailed Sep. 21, 2010.
Ameron International, Bondstrand Product Data, Bondstrand Series 7000M Fiberglas Pipe and Fittings for shipboard and offshore platform service, FP195C (Nov. 1999).
Ameron International, Bondstrand Product Data, Bondstrand Series 7000 Antistatic Fiberglass Pipe and Fittings for industrial service, FP305D (Aug. 2000).
Barber, A. et al., Characterization of E-glass-polypropylene Interfaces using Carbon Nanotubes as Strain Sensors, Composites Science and Technology, vol. 64, pp. 1915-1919, 2004.

(Continued)

*Primary Examiner* — Michael J Feely
(74) *Attorney, Agent, or Firm* — Kilpatrick Townsend & Stockton LLP

(57) ABSTRACT

The present invention, in one aspect, provides aqueous dispersions of carbon nanotubes. In some embodiments such aqueous dispersions can be applied to fiber glass strands to impart one or more electrically conductive properties to the fiber glass strands.

28 Claims, No Drawings

(56) References Cited

OTHER PUBLICATIONS

Chatterjee, A. et al., Electrically Conductive Carbon Nanofiber Composites with High-Density Polyethylene and Glass Fibers, Materials and Manufacturing Processes, vol. 22, pp. 62-65, 2007.

Colbert, D. et al., Single-wall Nanotubes: A New Option for Conductive Plastics and Engineering Polymers, Plastics Additives and Compounding, pp. 18-25, 2003.

Coleman, J. et al., Small but Strong: A Review of the Mechanical Properties of Carbon Nanotude-Polymer Composites, Carbon, vol. 44, pp. 1642-1652, 2006.

Curtzwiler, G. et al., Characterization and Compression Properties of Injection Molded Carbon Nanotube Composites, Journal of Applied Polymer Science, vol. 109, pp. 218-225, 2008.

Fan, Z. et al., Interlaminar Shear Strength of Glass Fiber Reinforced Epoxy Composites Enhanced with MultiWalled Carbon Nanotubes, Composites: Part A, vol. 39, pp. 540-554, 2008.

Fan, Z., et al., On Aligning Multi-walled Carbon Nanotubes to enhance Interlaminar Strength of Fiber Reinforced Composites (abstract), Proceedings of the American Society for Composites, Technical Conference (2005), 20th, 159/1-159/8 CODEN: PAMTEG; ISSN: 1084-7243.

Gao, S. et al., Surface Defects Repairing by Polymer Coating with Low Fraction of Nano-Reinforcements, Key Engineering Materials, Trans Tech Publications, Switzerland, 2007.

Gao, S. et al., Nanostructured Coatings of Glass Fibers: Improvement of Alkali Resistance and Mechanical Properties, Acta Materialia, vol. 55, pp. 1043-1052, 2007.

Gao,S. et al., Large Enhancement of Mechanical Properties and Environmental Resistance of Glass Fibre from Polymer Coating with Low Fraction of Nano-Reinforcements, NSTI Nanotech 2006, NSTI Nanotechnology Conference and Trade Show, Boston, MA, US, May 7-11, 2006, ISBN: 0-9767985-9-X.

Grimmer, C. et al., High-cycle Fatigue of Hybrid Carbon Nanotube/Glass Fiber/Polymer Composites, J. Mater. Sci., vol. 43, pp. 4487-4492, 2008.

Grunlan, J. et al., High Concentration Aqueous Mixtures of Single Walled Nanotubes, Mat. Res. Soc. Symp. Proc., vol. 772, pp. M9.1.1-M9.1.4, 2003.

Hsiao, K. et al., Investigation on the Spring-In Phenomenon of Carbon Nanofiber-Glass Fiber/Polyester Composites Manufactured with Vacuum Assisted Resin Transfer Molding, Composites: Part A, vol. 39, pp. 834-842, 2008.

Kim, J. et al., Incorporation of Single-Walled Carbon Nanotubes in Epoxy Composites, International SAMPE Technical Conference, 2003.

Lebedkin, S. et al., Raman Study of Individually Dispersed Single-Walled Carbon Nanotubes Under Pressure, Physical Review B, vol. 73, pp. 094109-1-12, 2006.

Mader, E. et al., Commingled Yarns of Surface Nanostructured Glass and Polypropylene Filaments for Effective Composite Properties, J. Mater. Sci., vol. 42, pp. 8062-8070, 2007.

Mader, E. et al., Commingled Yarns—Processign Aspects and Tailored Surfaces of Polypropylene/Glass Composites, Composites: Part A, vol. 39, pp. 612-623, 2008.

O'Connell, M. et al., Reversible Water-Solubilization of Single-Walled Carbon Nanotubes by polymer Wrapping, Chemical Physics Letters, vol. 342, pp. 265-271, 2001.

Phillips, H. et al., Carbon Nanotube Functionalization: Towards Enhancing the Mechanical Properties of Reinforced Composites (abstract), Abstracts, $62^{nd}$ Southwest Regional Meeting of the American Chemical Society, Houston, TX, Oct. 19-22, 2006, SRM-752 Publisher: American Chemical Society, Washington, D.C.

Qui, J. et al., Carbon Nanotube Integrated Cultifunctional Mutiscale Composites, Nanotechnology, vol. 18, pp. 1-11, 2007.

Sadeghian, R. et al., P161: Mode-I Delamination Characterization for Carbon Nanofibers Toughened Polyester/Glassfiber Composites, International SAMPE Symposium and Exhibition, 2005.

Sadeghian, R. et al., Manufacturing Carbon Nanofibers Toughened Polyester/Glass Fiber Composites using Vacuum Assisted Resin transfer Molding for Enhancing the Mode-I Delamination Resistance, Composites: Part A, vol. 37, pp. 1787-1795, 2006.

Sandler, J. et al., Development of a Dispersion Process for Carbon Nanotubes in an Epoxy Matrix and the resulting Electrical Properties, Polymer, vol. 40, pp. 5967-5971, 1999.

Shen, S. et al., Thermal Properties and Fire Performance of Woven Glass Fibre Reinforced Nylon 6 Nano-Composited with Carbon Nanotubes, Advanced Materials Research, Zuerich, Switzerland, 2008.

Shim, B. et al., Smart Electronic Yarns and Wearable Fabrics for Human Biomonitoring made by Carbon Nanotube Coating with Polyelectrolytes, NANO Letters, vol. XX, No. X, 2008.

Siddiqui, N. et al., Self-Healing Glass Fibres with Carbon Nanotube-Epoxy Nanocomposite Coating, Key Engineering Materials, vol. 334-335, pp. 805-808, 2007.

Spitalsky, Z. et al., Carbon Nanotube-polymer Composites: Chemistry, Processing, Mechanical and Electrical Properties, Progress in Polymer Science, vol. 35, pp. 257-401, 2010.

Sureeyatanapas, P. et al., Nanotube Composite Coatings as Strain Sensors on Glass Fibres in Epoxy Composites, $13^{th}$ European Conference on Composite Materials, Jun. 2, 2008, website at http://extra.ivf.se/eccm13_programme/abstracts/807, as available via the Internet.

Tibbetts, G. et al., Conductivity of Thermoplastic Composites Compounded of Glass Fibers and Carbon Nanofibers, International SAMPE Technical Conference, vol. 35, 2003.

Van Hattum, F. et al., Conductive Long Fibre Reinforced Thermoplastics by Using Carbon Nanofibres, Plastics, Rubber and Composites, col. 35, pp. 247-252, 2006.

Xu, G. et al., Synthesis and Characterization of Water-Soluble Multiwalled Carbon Nanotubes grafted by a Thermoresponsive Polymer, Nanotechnology, vol. 17, pp. 2458-2465, 2006.

Yan, Z. et al., Study on the Electromagnetic Properties on mwcnts/gf/epoxy, International Conference on Smart Materials and Nanotechnology in Engineering, Proc. of SPIE, vol. 6423, pp. 64235D-1-64235D-6, 2007.

Zhang, X. et al., Poly(vinyl alcohol)/SWNT Composite Film, Nano Letters, vol. 3, No. 9, pp. 1285-1288, 2003.

Zhou, G. et al., Preparation and Properties of Nanoparticle and Long Fiber Reinforced Thermoset Composites, Annual Technical Conference—Society of Plastics Engineers, pp. 1389-1393, 2007.

Zhu, J. et al., Processing a Glass Fiber Reinformces Vinyl Ester Composite with Nanotube Enhancement of Interlaminar Shear Strength, Composites Science and Technology, vol. 67, pp. 1509-1517, 2007.

United States Patent and Trademark Office, Office Action, U.S. Appl. No. 12/782,368, mailed Oct. 5, 2012.

United States Patent and Trademark Office, Response to Office Action, U.S. Appl. No. 12/782,368, filed Feb. 1, 2013.

\* cited by examiner

AQUEOUS DISPERSIONS AND METHODS OF MAKING SAME

CROSS-REFERENCE TO RELATED APPLICATION

The present application claims priority pursuant to 35 U.S.C. §119(e) to U.S. Provisional Patent Application Ser. No. 61/179,138, filed May 18, 2009 which is hereby incorporated by reference in its entirety.

FIELD OF THE INVENTION

The present invention relates generally to aqueous dispersions, methods of making aqueous dispersions, coating compositions for glass fibers, coated glass fibers, fiber glass strands, methods of making fiber glass strands, articles reinforced with coated glass fibers, and polymeric composites.

BACKGROUND

Glass fiber reinforced polymeric composite materials find application in a wide variety of fields due to the excellent mechanical and cost efficient properties offered by such composites. One field, however, where the application of glass fiber reinforced polymeric composites is challenging is that of electrically conductive materials. Many glass fiber reinforced thermoplastic and thermoset composites are not electrically conductive thereby limiting their use in applications requiring materials having electrical conductivity.

Polymeric composites can be fabricated to demonstrate some electrical conductivity by the use of conjugated polymer systems or by incorporating significant amounts of electrically conductive particles into the polymeric resin. Both of these solutions, however, have associated disadvantages. For example, conjugated polymeric systems can be susceptible to oxidation and other mechanisms of deterioration which substantially limit the conductive lifetimes of such systems. Moreover, incorporating large quantities of conductive particles into a polymeric resin can significantly compromise the mechanical properties of the resin leading to processing problems and premature failure of parts constructed therefrom. Additionally, conjugated polymeric materials and polymeric composites comprising high amounts of conductive particles can be expensive.

SUMMARY

In one aspect, the present invention provides aqueous dispersions of electrically conductive particles. In some embodiments, an aqueous dispersion comprises carbon nanotubes and a polymeric carrier. An aqueous dispersion, in some embodiments, comprises carbon nanotubes in an amount of at least about 1 weight percent on a total solids basis. In some embodiments, an aqueous dispersion comprises carbon nanotubes in an amount of at least about 5 weight percent or at least about 10 weight percent on a total solids basis. In some embodiments, an aqueous dispersion comprises carbon nanotubes in an amount ranging from about 5 weight percent to about 15 weight percent on a total solids basis.

In another aspect, the present invention provides aqueous coating compositions for glass fibers. In some embodiments, an aqueous coating composition comprises carbon nanotubes in a polymeric carrier. In some embodiments, carbon nanotubes are present in an aqueous coating composition in an amount up to about 10 weight percent on a total solids basis. Moreover, in some embodiments, a coating composition comprises at least one additional component. In some embodiments, the at least one additional component comprises one or more film formers, coupling agents, lubricants, surfactants, biocides or anti-foaming agents of combinations thereof.

In another aspect, the present invention provides fiber glass strands comprising an electrically conductive structure. Some embodiments of fiber glass strands of the present invention can be used in encapsulation, impregnation and reinforcement applications of a variety of polymeric resins, including thermoplastic and/or thermoset resins, in the production of electrically conductive polymeric composite materials.

In some embodiments, a fiber glass strand comprises an electrically conductive structure, the electrically conductive structure comprising one or more glass fibers coated with a coating composition comprising carbon nanotubes in a polymeric carrier, the fiber glass strand having an electrical resistivity ranging from about $0.1 \text{ k}\Omega\cdot\text{cm}^{-1}$ to about $20 \text{ M}\Omega\cdot\text{cm}^{-1}$. Resistivity of a fiber glass strand, according to embodiments of the present invention, is determined by measuring the electrical resistance along a 2.5 cm length of the strand. In some embodiments of a fiber glass strand comprising an electrically conductive structure, the coating composition comprises at least one component in addition to the carbon nanotubes and polymeric carrier.

Moreover, in some embodiments, a fiber glass strand can have a volume resistivity ranging from about $2 \Omega\cdot\text{cm}$ to about $0.1 \text{ M}\Omega\cdot\text{cm}$. Fiber glass strand volume resistivity, according to embodiments of the present invention can be calculated from fiber glass strand electrical resistance according to formula (I)

$$(R \cdot S)/L \qquad (I)$$

wherein R is the resistance of the fiber glass strand, S is the cross-sectional area of the fiber glass strand and L is the length of the fiber glass strand.

In some embodiments, the electrically conductive structure of a fiber glass strand comprises a plurality of glass fibers coated with a coating composition comprising carbon nanotubes in a polymeric carrier. In some embodiments, the coating composition further comprises at least one component in addition to the carbon nanotubes and the polymeric carrier.

Carbon nanotubes, in some embodiments of compositions and methods described herein, can comprise single-walled carbon nanotubes (also referred to herein as "SWCNT"), multi-walled carbon nanotubes (also referred to herein as "MWCNT") or mixtures thereof. In some embodiments, as described herein, the plurality of carbon nanotubes are dispersed in the polymeric carrier. The polymeric carrier, in some embodiments, can demonstrate film forming properties and can serve as a film former. Moreover, in some embodiments, polymeric carriers comprise aqueous polymeric dispersions.

In some embodiments, a coating composition is applied to glass fibers of a fiber glass strand by drawing the fiber glass strand through a bath or reservoir of the coating composition. In another embodiment, a coating composition comprising carbon nanotubes in a polymeric carrier can be applied to glass fibers as a primary sizing composition. In some embodiments, a coating composition comprising carbon nanotubes in a polymeric carrier can be applied to glass fibers as a secondary sizing composition. As used herein, the term "primary sizing composition" refers to a sizing composition applied to fibers immediately after formation of the fibers. As used herein, the term "secondary sizing" refers to a composition applied to fibers after application of the primary sizing.

In some embodiments, fiber glass strands comprising an electrically conductive structure are continuous strands. In some embodiments, a plurality of continuous fiber glass strands comprising an electrically conductive structure are assembled into continuous rovings.

In another aspect, the present invention provides electrically conductive glass fiber reinforced polymeric composites. In various embodiments, the electrically conductive glass fiber reinforced polymeric composites can be thermoplastic composites or thermoset composites. Embodiments of polymeric composites comprise a polymeric resin and at least one fiber glass strand of the present invention comprising an electrically conductive structure, the electrically conductive structure comprising one or more glass fibers coated with a coating composition comprising a plurality of carbon nanotubes and a polymeric carrier. In some embodiments of a polymeric composite, one or more glass fibers are coated with a coating composition comprising a plurality of carbon nanotubes and a polymeric carrier and at least one additional component. As described herein, in some embodiments, the at least one addition component comprises one or more film formers, coupling agents, lubricants, biocides or anti-foaming agents of combinations thereof.

In some embodiments, continuous fiber glass strands comprising an electrically conductive structure can be used in winding applications wherein a polymeric composite is produced by continuous filament winding techniques.

In some embodiments, a polymeric composite comprising one or more electrically conductive continuous fiber glass strands has an electrical resistivity less than the resistivity of an individual electrically conductive continuous fiber glass strand used in the fabrication of the composite. In one embodiment, for example, a polymeric composite comprising one or more continuous fiber glass strands of the present invention displays a volume resistivity less than about 0.1 MΩ·cm. In another embodiment, a polymeric composite comprising one or more continuous fiber glass strands described herein displays a volume resistivity less than about 0.03 MΩ·cm. In some embodiments, a polymeric composite comprising one or more continuous fiber glass strands described herein displays a volume resistivity less than about 0.002 MΩ·cm. In some embodiments, a polymeric composite comprising one or more continuous fiber glass strands described herein has a volume resistivity ranging from about 0.002 MΩ·cm to about 100 MΩ·cm. As used herein, the "volume resistivity" of a polymeric composite of the present invention means the volume resistivity as measured according to ASTM D257-07.

In another aspect, the present invention provides methods of making an aqueous dispersion of carbon nanotubes. In some embodiments, a method of making an aqueous dispersion of carbon nanotubes comprises providing a polymeric carrier and mixing the carbon nanotubes with the polymeric carrier, the polymeric carrier comprising an aqueous dispersion of one or more polymeric species. In some embodiments, a method of making an aqueous dispersion of carbon nanotubes further comprises reducing the particle size of the carbon nanotubes and/or adding a viscosity modifier to the aqueous dispersion.

In another aspect, the present invention provides methods of making coating compositions for glass fibers. In some embodiments, a method of making a coating composition for glass fibers comprises providing an aqueous dispersion comprising carbon nanotubes and a polymeric carrier. Carbon nanotubes and polymeric carriers used in the present methods, in some embodiments, can comprise any of the same described herein. In some embodiments, a method of making a coating composition for glass fibers further comprises providing at least one additional component and adding the at least one additional component to the aqueous dispersion comprising carbon nanotubes and a polymeric carrier.

In another aspect, the present invention provides methods of making a fiber glass strand comprising an electrically conductive structure, the electrically conductive structure comprising one or more glass fibers coated with a coating composition comprising carbon nanotubes in a polymeric carrier. In one embodiment, a method of making a fiber glass strand of the present invention comprises providing a coating composition comprising carbon nanotubes in a polymeric carrier, drawing a fiber glass strand through the coating composition, removing excess coating composition from the fiber glass strand and drying the fiber glass strand. In some embodiment, the coating composition comprises at least one additional component as described herein.

In another aspect, the present invention provides methods of making an electrically conductive glass fiber reinforced polymeric composite. In one embodiment, a method of making an electrically conductive glass fiber reinforced polymeric composite comprises providing one or more continuous fiber glass strands of the present invention comprising an electrically conductive structure and disposing the one or more continuous fiber glass strands in a polymeric resin. Moreover, in some embodiments, glass fiber strands comprising an electrically conductive structure are combined with non-electrically conductive fiber glass strands in the production of a reinforced polymeric composite.

These and other embodiments are described in greater detail in the Detailed Description which follows.

DETAILED DESCRIPTION

For the purposes of this specification, unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

It is further noted that, as used in this specification, the singular forms "a," "an," and "the" include plural referents unless expressly and unequivocally limited to one referent.

The present invention will be discussed generally in the context of its use in the production, assembly, and application of glass fibers. However, one of ordinary skill in the art would understand that the present invention may be useful in the processing of other textile materials and, in particular, textile materials that are not generally considered to be electrically conductive.

I. Aqueous Dispersions of Carbon Nanotubes

In one aspect, the present invention provides aqueous dispersions of electrically conductive particles. In some embodiments, an aqueous dispersion comprises carbon nanotubes and a polymeric carrier.

In some embodiments, carbon nanotubes suitable for use in aqueous dispersions described herein comprise SWCNT, MWCNT or mixtures thereof. In some embodiments, a majority of carbon nanotubes in the aqueous dispersion have an aspect ratio of at least 25. The aspect ratio of a carbon nanotube is the length of the carbon nanotube divided by the diameter of the carbon nanotube. In some embodiments, a majority of carbon nanotubes have an aspect ratio of at least 100 or at least 500. In another embodiment, a majority of carbon nanotubes of sizing compositions of the present invention have an aspect ratio greater than 1000.

Carbon nanotubes, in some embodiments, are present in the aqueous dispersion in an amount of at least about 1 weight percent on a total solids basis. In some embodiments, carbon nanotubes are present in the aqueous dispersion in an amount of at least about 5 weight percent or at least about 10 weight percent on a total solids basis. In some embodiments, carbon nanotubes are present in the aqueous dispersion in amount of at least about 12 weight percent on a total solids basis. Carbon nanotubes, in some embodiments, are present in the aqueous dispersion in an amount of at least about 15 weight percent or at least about 20 weight percent on a total solids basis. In some embodiments, carbon nanotubes are present in the aqueous dispersion in an amount less 4 weight percent on a total solids basis. In some embodiments, carbon nanotubes are present in the aqueous dispersion in an amount less than about 3 weight percent or less than about 2 weight percent on a total solids basis.

In some embodiments, carbon nanotubes are present in the aqueous dispersion in an amount ranging from about 0.1 weight percent to about 30 weight percent on a total solids basis. In some embodiments, carbon nanotubes are present in the aqueous dispersion in am amount ranging from about 0.5 weight percent to about 15 weight percent on a total solids basis. In some embodiments, carbon nanotubes are present in the aqueous dispersion in an amount ranging from about 1 weight percent to about 10 weight percent on a total solids basis. In some embodiments, carbon nanotubes are present in the aqueous dispersion in an amount ranging from about 2 weight percent to about 7 weight percent on a total solids basis. Carbon nanotubes, in some embodiments, are present in the aqueous dispersion in an amount ranging from about 5 weight percent to about 10 weight percent on a total solids basis. In some embodiments, carbon nanotubes are present in the aqueous dispersion in an amount ranging from about 0.1 weight percent to about 4 weight percent on a total solids basis. In some embodiments, carbon nanotubes are present in the aqueous dispersion in an amount ranging from about 0.1 weight percent to about 3.5 weight percent or from about 1 weight percent to about 3 weight percent on a total solids basis. Carbon nanotubes, in some embodiments, are present in the aqueous dispersion in an amount ranging from about 0.1 weight percent to about 2 weight percent on a total solids basis.

In some embodiments, an aqueous dispersion comprises SWCNT commercially available from Carbon Nanotechnologies Incorporated of Houston, Tex. under the HIPCO® trade designation. In some embodiments, an aqueous dispersion comprises MWCNT commercially available from Bayer Material Science under the BAYTUBES® C150 HP trade designation.

In addition to a plurality of carbon nanotubes, an aqueous dispersion described herein comprises a polymeric carrier. In some embodiments, the carbon nanotubes are dispersed in the polymeric carrier.

A wide variety of polymeric carriers can be used, and persons of ordinary skill in the art can identify a number of suitable polymeric carriers based on the present disclosure and the desired use of the aqueous carbon nanotube dispersion. Suitable polymeric carriers, in some embodiments, for example, can be compatible with one or more polymeric resins and/or demonstrate advantageous properties for the dispersion of carbon nanotubes. In some embodiments, polymeric carriers comprise aqueous dispersions of one or more polymeric species.

A number of polymeric carriers can be used in various embodiments of coating compositions of the present invention. Non-limiting examples of polymeric carriers comprise polyurethanes, epoxides, polyvinylpyrrolidone (PVP) or mixtures or aqueous dispersions thereof. In some embodiments, a polymeric carrier can comprise one or more polyacrylates, polyesters or poly(vinyl acetates). In some embodiments, polymeric carriers comprise conductive polymers including polypyrrole, polyaniline, polyphenylene, polythiophene or mixtures or aqueous dispersions thereof.

In some embodiments, a PVP carrier is provided as an aqueous dispersion such as, for example, PVP K15, PVP K30 or mixtures thereof. Aqueous dispersions of PVP K15 and PVP K30 are commercially available from International Specialty Products of Wayne, N.J.

As provided herein, in some embodiments utilizing polyurethane as a polymeric carrier, a polyurethane carrier can be provided as aqueous dispersions such as, for example, the WITCOBOND® series provided by Chemtura Corporation of Middlebury, Conn., including, but not limited to, WITCOBOND® W-290H and WITCOBOND® W-296. Additional examples of commercially available polyurethane aqueous dispersions comprise Aquathane 516 from Reichhold Chemical Company and Hydrosize U2-01 from Hydrosize Technologies, Inc.

In some embodiments, polyurethane carriers comprise aqueous solutions of polyurethane polymers formed by a reaction between an organic isocyanate or polyisocyanate and an organic polyhydroxylated compound or hydroxyl terminated polyether or polyester polymer. The polyurethane dispersion may contain a crosslinking group, in some embodiments.

Another example of a suitable polyurethane carrier is an aqueous emulsion of a polyether-polyurethane NAJ-1037 from Bayer Chemical. Further, the polyurethane may be part of a dispersion comprising a polyurethane and a blocked isocyanate. For example, the following polyurethane/blocked isocyanate emulsions may be suitable for use in the coating compositions of the present invention: WITCOBOND 60X (Chemtura), Baybond 403 (Bayer), Baybond PU-130 (Bayer), Baybond XP-7055 (Bayer), Nopco D641 (Henkel), Neoxil 6158 (DSM), and Vestanat EP-DS-1205 (Degussa).

In some embodiments, a polymeric carrier can comprise epoxide compositions. Suitable epoxide compositions for use as carbon nanotube carriers, according to some embodiments, comprise EPON epoxies and EPI-REZ epoxies commercially available Hexion Specialty Chemicals of Columbus, Ohio.

In some embodiments, a polymeric carrier is an aqueous dispersion of a reaction product of an alkoxylated amine and a polycarboxylic acid, which is further reacted with an epoxy compound. In some embodiments, such as reaction product is available from Hexion Specialty Chemicals of Columbus, Ohio under the RD1135-B trade designation. In some embodiments, a reaction product of an alkoxylated amine and a polycarboxylic acid, which is further reacted with an epoxy compound comprises the same product described in U.S. patent application Ser. No. 12/002,320, which is incorporated herein by reference in its entirety.

In some embodiments, an aqueous dispersion comprises at least one polymeric carrier in an amount up to 99.9 weight percent on a total solids basis. In some embodiments, a coating composition comprises at least one polymeric carrier in an amount up to about 99.5 weight percent on a total solids basis. In another embodiment, a coating composition comprises at least one polymeric carrier in an amount of at least about 90 weight percent on a total solids basis. In some embodiments, a coating composition comprises at least one polymeric carrier in an amount of at least about 95 or at least about 97 weight percent on a total solids basis.

In some embodiments, carbon nanotubes of an aqueous dispersion described herein are in agglomerate form to provide carbon nanotube particles. A carbon nanotube particle, for example, is composed of a plurality of carbon nanotubes. An aqueous dispersion, in some embodiments, has an average carbon nanotube particle size less than about 2 µm. In some embodiments, an aqueous dispersion has an average carbon nanotube particle size less than about 1 µm. In some embodiments, an aqueous dispersion has an average carbon nanotube particle size less than about 750 nm or less than about 500 nm. In some embodiments, an aqueous dispersion has an average carbon nanotube particle size ranging from about 250 nm to about 1 µm. Moreover, in some embodiments, aqueous dispersion comprising particles of carbon nanotubes has a rating on the Hegman scale or National Standard scale of 8.

An aqueous dispersion comprising carbon nanotubes and a polymeric carrier, in some embodiments, has a viscosity falling within a range set forth in Table 1.

TABLE 1

Aqueous Dispersion Viscosities

| RPM | Viscosity Range (cP) | Viscosity Range (cP) |
|---|---|---|
| 0.5 | 2500-7000 | >2500 |
| 1 | 2200-6600 | >2200 |
| 2.5 | 1800-30,000 | >1800 |
| 5 | 1100-4500 | >1100 |
| 10 | 750-7500 | 15-500 |
| 20 | 500-2500 | 10-300 |
| 50 | 300-1500 | 10-150 |

Viscosities of aqueous dispersions comprising carbon nanotubes and a polymeric carrier, in some embodiments, are determined using a Brookfield DV-II+CP viscometer at 25° C.

II. Methods of Making Aqueous Dispersions of Carbon Nanotubes

In another aspect, the present invention provides methods of making an aqueous dispersion of carbon nanotubes. In some embodiments, a method of making an aqueous dispersion of carbon nanotubes comprises providing a polymeric carrier and mixing the carbon nanotubes with the polymeric carrier, the polymeric carrier comprising an aqueous dispersion of one more polymeric species. Carbon nanotubes and polymeric carriers used in the present methods, in some embodiments, can comprise any of the same described herein.

In some embodiments, carbon nanotubes are mixed with a polymeric carrier in an amount of up to about 30 weight percent on a total solids basis of the resulting mixture. Carbon nanotubes, in some embodiments, are mixed with a polymeric carrier in an amount of up to about 20 weight percent or up to about 15 weight percent on a total solids basis of the resulting mixture. In some embodiments, carbon nanotubes are mixed with a polymeric carrier in an amount of up to about 10 weight percent on a total solids basis of the resulting mixture. Carbon nanotubes, in some embodiments, are mixed with a polymeric carrier in an amount ranging from about 1 weight percent to about 30 weight percent on a total solids basis of the resulting mixture. In some embodiments, carbon nanotubes are mixed with a polymeric carrier in an amount ranging from about 1 weight percent to about 15 weight percent on a total solids basis of the resulting mixture. In some embodiments, carbon nanotubes are mixed with a polymeric carrier in an amount ranging from about 5 weight percent to about 13 weight percent on a total solids basis of the resulting mixture.

In some embodiments, carbon nanotubes are provided in agglomerate form. An agglomerate of carbon nanotubes, in some embodiments, has a size of less than 1 mm. In some embodiments, an agglomerate of carbon nanotubes has a size less than 750 µm or less than 500 µm. In some embodiments, an agglomerate of carbon nanotubes has a size ranging from about 100 µm to about 1 mm.

Mixing carbon nanotubes with a polymeric carrier can be administered for any period of time achieving the desired consistency and/or viscosity. In some embodiments, mixing times are dependent on one or more factors including nanotube loading, identity of the polymeric carrier and batch size of the aqueous dispersion.

In some embodiments, mixing of the carbon nanotubes and the polymeric carrier is administered for at least 10 minutes. In some embodiments, mixing of the carbon nanotubes and the polymeric carrier is administered for at least 30 minutes. Mixing of the carbon nanotubes and the polymeric carrier, in some embodiments, is administered for at least 60 minutes or at least 90 minutes. In some embodiments, mixing of the carbon nanotubes and the polymeric carrier is administered for at least 120 minutes or at least 150 minutes. In some embodiments, mixing of the carbon nanotubes and the polymeric carrier is administered for a time period ranging from about 1 minute to about 150 minutes.

Moreover, in some embodiments, carbon nanotubes are mixed with a polymeric carrier in one or more mixing apparatus. In some embodiments, suitable mixing apparatus comprise rotor-stator assemblies such as a Ross ME 400 DLA In-line Mixer/Emulsifier. Mixing speeds of rotor-stator assemblies, in some embodiments, can be determined according to a variety of considerations including nanotube loading, identity of the polymeric carrier and batch size of the aqueous dispersion.

In some embodiments, a method of making an aqueous dispersion comprising carbon nanotubes and a polymeric carrier further comprises reducing the particle size of the carbon nanotubes. Reducing carbon nanotube particle size, in some embodiments, comprises milling the aqueous dispersion. In some embodiments, the aqueous dispersion comprising carbon nanotubes and a polymeric carrier is milled for any amount of time achieving the desired particle size of carbon nanotubes. In some embodiments, a Hegman grind bar is used to monitor the progression of the particle size of carbon nanotubes during milling. In some embodiments, an aqueous dispersion comprising carbon nanotubes and a polymeric carrier is milled until a reading of 8 on the Hegman or National Standard scale is reached.

In some embodiments, a suitable milling apparatus for aqueous dispersions described herein is a Premier HM Series horizontal media mill commercially available from Premier Mill of Delavan, Wis. In some embodiments, suitable milling apparatus comprise an Eiger 250 ml Mini Motor Mill from Eiger Machinery Inc. of Graylake, Ill. or a DISPERMAT® CN10/VMA Torusmill from VMA-Getzman GmbH. In some embodiments, suitable milling apparatus comprises a rotor/stator assembly with a slotted screen. In some embodiments, such an assembly is available from Charles Ross and Son Company of Hauppauge, N.Y. under trade designation Ross HSM-100L Mixer/Emulsifier. Additionally, in some embodiments, a suitable milling apparatus comprises a high speed mixer/disperser such as an Air-powered laboratory stirrer Model 102A from Fawcett Co., Inc. of Richfield, Ohio.

In some embodiments, a method of making an aqueous dispersion comprising carbon nanotubes and a polymeric carrier further comprises adding a viscosity modifier to the aqueous dispersion. A viscosity modifier, in some embodiments, can reduce the viscosity of the aqueous dispersion comprising the carbon nanotubes and the polymeric carrier. In some embodiments, suitable viscosity modifiers do not disturb or do not substantially disturb the stability of the aqueous dispersion. In some embodiments, a viscosity modifier comprises an aqueous dispersion of one or more polymeric species. In some embodiments, additional polymeric carrier can be added to the aqueous dispersion of carbon nanotubes as a viscosity modifier.

A viscosity modifier can be added to an aqueous dispersion described herein in any amount to achieve any desired viscosity of the aqueous dispersion.

III. Coating Compositions for Glass Fibers

In another aspect, the present invention provides coating compositions for glass fibers. In some embodiments, a coating composition comprises an aqueous dispersion comprising carbon nanotubes in a polymeric carrier. In some embodiments, a coating composition for glass fibers comprises an aqueous dispersion described in Section I hereinabove.

Carbon nanotubes, in some embodiments, are present in an aqueous dispersion of a coating composition in an amount of at least about 1 weight percent on a total solids basis. In some embodiments, carbon nanotubes are present in an aqueous dispersion of a coating composition in an amount of at least about 5 weight percent or at least about 7 weight percent on a total solids basis. In some embodiments, carbon nanotubes are present in the aqueous dispersion of a coating composition in an amount less 4 weight percent on a total solids basis. In some embodiments, carbon nanotubes are present in an aqueous dispersion of a coating composition in an amount less than about 3 weight percent or less than about 2 weight percent on a total solids basis.

In some embodiments, carbon nanotubes are present in an aqueous dispersion of a coating composition in an amount ranging from about 0.1 weight percent to about 10 weight percent on a total solids basis. In some embodiments, carbon nanotubes are present in an aqueous dispersion of a coating composition in an amount ranging from about 0.5 weight percent to about 7 weight percent on a total solids basis. In some embodiments, carbon nanotubes are present in an aqueous dispersion of a coating composition in an amount ranging from about 1 weight percent to about 5 weight percent on a total solids basis. In some embodiments, carbon nanotubes are present in an aqueous dispersion of a coating composition in an amount ranging from about 1 weight percent to about 3.5 weight percent on a total solids basis. In some embodiments, carbon nanotubes are present in an aqueous dispersion of a coating composition in an amount ranging from about 2 weight percent to about 4 weight percent on a total solids basis. In some embodiments, carbon nanotubes are present in an aqueous dispersion of a coating composition in an amount ranging from about 0.1 weight percent to about 3.5 weight percent or from about 1 weight percent to about 3 weight percent on a total solids basis. Carbon nanotubes, in some embodiments, are present in an aqueous dispersion of a coating composition in an amount ranging from about 0.1 weight percent to about 2 weight percent on a total solids basis.

In some embodiments, in addition to an aqueous dispersion comprising carbon nanotubes and a polymeric carrier, a coating composition further comprises at least one additional component. In some embodiments, the at least one additional component comprises one or more film formers, coupling agents, lubricants, surfactants, biocides or anti-foaming agents or combinations thereof.

In some embodiments, the at least one additional component of a coating composition for glass fibers described herein comprises one or more film formers. Any film former known to one of skill in the art not inconsistent with the objectives of the present invention can be used. Suitable film formers, in some embodiments, for example, can be compatible with one or more polymeric resins.

The selection of a film former may depend on the polymeric resin to be reinforced to enhance compatibility between the resin and glass fibers coated with a coating comprising described herein. Additionally, selection of a film former may depend on the type of fiber to be sized. In some embodiments, a film former does not disturb or substantially disturb the stability of the aqueous dispersion of carbon nanotubes in the coating composition.

A number of film formers can used in various embodiments of the present invention. Non-limiting examples of film formers for use in various embodiments of the present invention comprise chemically modified polyolefins, polyurethanes, epoxides, or mixtures or aqueous dispersions thereof. In some embodiments, a film former can comprise one or more polyacrylates, polyesters, poly(vinyl acetates), polyvinyl alcohols or polyvinylpyrrolidones.

A film former comprising a chemically modified polyolefin, in some embodiments, is provided as an aqueous emulsion. The term "chemically-modified polyolefin" refers to acid or acid anhydride modified polyolefins either amorphous or crystalline, such as those produced by the method detailed in U.S. Pat. No. 3,416,990, U.S. Pat. No. 3,437,550 and U.S. Pat. No. 3,483,276, each of which is incorporated herein by reference. A discussion of these polyolefins, their modification and emulsification can be found in U.S. Pat. No. 5,130,197, which is incorporated herein by reference.

An example of a crystalline carboxylated polypropylene polymer useful as a film former, in some embodiments of the present invention, is the HERCOPRIME® type resin commercially available from Hercules, Inc. of Bloomington, Del. An example of an amorphous carboxylated polypropylene polymer is EPOLENE® E-43 resin commercially available from the Westlake Chemical Corporation of Longview, Tex. Another suitable film former material is an aqueous emulsion of the EPOLENE E-43 resin, commercially available from Byk-Cera under the trade designation Novacer 1841 emulsion. CHEMCOR 43C30 amorphous carboxylated polypropylene aqueous emulsion commercially available from Chemical Corporation of America is another example of a film former suitable for use in some embodiments. Another commercially available version of an aqueous polyolefin emulsion useful as a film former in some embodiments is the carboxylated amorphous polypropylene from National Starch, Procter Division, sold under the trade designation Protolube RL-5440 polypropylene emulsion. A further suitable film former is an aqueous emulsion of a high molecular weight maleic anhydride grafted polypropylene emulsion commercially available from DSM, B.V. of the Netherlands under the Neoxil 605 trade designation.

Suitable film formers for some embodiments comprise polyurethanes. Polyurethane film forming materials, in some embodiments, are useful for polyamide resin reinforcement applications. In some embodiments, polyurethane film forming compositions are provided as aqueous dispersions such as, for example, the WITCOBOND® series provided by Crompton Corporation-Uniroyal Chemical, including, but not limited to, WITCOBOND® W-290H and WITCOBOND® W-296. Additional examples of commercially available polyurethane aqueous dispersions comprise Aquathane 516 from Reichhold Chemical Company and Hydrosize U2-01 from Hydrosize Technologies, Inc.

In some embodiments, polyurethane film formers comprise aqueous solutions of polyurethane polymers formed by a reaction between an organic isocyanate or polyisocyanate and an organic polyhydroxylated compound or hydroxyl terminated polyether or polyester polymer. The polyurethane dispersion may contain a crosslinking group, in some embodiments.

Another example of a suitable polyurethane is an aqueous emulsion of a polyether-polyurethane NAJ-1037 from Bayer Chemical. Further, the polyurethane may be part of a dispersion comprising a polyurethane and a blocked isocyanate. For example, the following polyurethane/blocked isocyanate emulsions may be suitable for use in the sizing compositions of the present invention: WITCOBOND 60X (Crompton), Baybond 403 (Bayer), Baybond PU-130 (Bayer), Baybond XP-7055 (Bayer), Nopco D641 (Henkel), Neoxil 6158 (DSM), and Vestanat EP-DS-1205 (Degussa).

A film former, in some embodiments, comprises a polyester. A polyester film former, in some embodiments, can be provided as an aqueous dispersion or emulsion. An aqueous polyester dispersion is commercially available from DSM, B.V. of the Netherlands under the trade designation Neoxil 9166. In some embodiments, polyesters comprise aromatic structures such as phenolic moieties. Neoxil 954D, an aqueous emulsion of a bisphenol-A polyester, for example, is commercially available from DSM, B.V. In some embodiments, a polyester film former comprises a polyester-polyurethane film former. A polyester-polyurethane film former is commercially available from DSM B.V. under the Neoxil 9851 trade designation.

In some embodiments, a film former can comprise epoxide compositions. Suitable epoxide compositions for use as film formers, according some embodiments, comprise EPON epoxides and EPI-REZ epoxides commercially available Hexion Specialty Chemicals of Columbus, Ohio. In some embodiments, epoxide compositions comprise aromatic structures including phenolic moieties, such as bisphenol and/or bisphenol novolac epoxides. In one embodiment, for example, an phenolic epoxide composition is commercially available from DSM B.V. under the Neoxil 8294 trade designation or commercially available from Hexion Specialty chemicals under the EPI-REZ RSW-4254 trade designation.

A film former, in some embodiments, comprises a polyvinylpyrrolidone. In some embodiments, a polyvinylpyrrolidone film former is provided as an aqueous dispersion such as, for example, PVP K15, PVP K30 or mixtures thereof. Aqueous dispersions of PVP K15 and PVP K30 are commercially available from International Specialty Products of Wayne, N.J.

A film former, in some embodiments, comprises a chemically modified wood rosin. In some embodiments, a chemically modified wood rosin is commercially available from Eka Chemicals AB, Sweden, under the Dynakoll SI 100T trade designation. In some embodiments, a film former comprises a chemically modified wood rosin as disclosed in United States Patent Application Publication 20070079730, which is hereby incorporated by reference in its entirety.

In some embodiments, a film former comprises polyvinylacetate aqueous dispersions or emulsions. A polyvinylacetate film former is commercially available from Celanese Emulsions under the trade designation RESYN® 1037.

In some embodiments, a film former comprises one or more polyols. Examples of polyols useful in some embodiments of the present invention can include various polyvinyl alcohols (PVA), polyethylenevinyl alcohols (EVOH), polyethylene glycols (PEG), and/or mixtures thereof. Polyols used in some embodiments of the present invention can be hydrolyzed to different extents depending on the desired application. In some embodiments, for example, a polymeric film-former can comprise polyvinyl alcohol that is greater than 80% hydrolyzed. In other embodiments, for example, the polyvinyl alcohol can be greater than 85% hydrolyzed. In another embodiment, a polymeric film-former can comprise polyvinyl alcohol greater than 95% hydrolyzed.

Non-limiting examples of commercially available polymeric film-formers for use in some embodiments of coating compositions described herein comprise CELVOL® 205 available from Celanese Corporation and ELVANOL® 85-82 available from DUPONT®. In some embodiments, a single polyol (e.g., CELVOL® 205 or ELVANOL® 85-82) can be used, while in other embodiments, multiple polyols (e.g., CELVOL® 205 and ELVANOL® 85-82) can be used.

A film former, in some embodiments, comprises aqueous olefinic emulsions or dispersions. In some embodiments, an aqueous olefinic emulsion comprises a polyethylene emulsion. In some embodiments, an aqueous olefinic emulsion comprises a polypropylene emulsion. An aqueous polypropylene emulsion is commercially available from BYK USA, Inc. under the trade designation AQUACER® 1500.

In some embodiments, a film former comprises an acrylate latex. In some embodiments, an acrylate latex is commercially available from H.B. Fuller under the trade designation FULATEX® PD2163.

In some embodiments, a film former is present in a coating composition for glass fibers described herein in an amount of up to about 99 weight percent on a total solids basis. In some embodiments, a film former is present in a coating composition in an amount of up to about 90 weight percent on a total solids basis. A film former, in some embodiments, is present in a coating composition in an amount of up to about 80 weight percent on a total solids basis. In some embodiments, a film former is present in a coating composition in an amount of at least about 50 weight percent on a total solids basis. In some embodiments, a film former is present in a coating composition in an amount of at least about 60 weight percent on a total solids basis.

In some embodiments, a film former is present in a coating composition in an amount ranging from about 50 weight percent to about 99 weight percent on a total solids basis. A film former, in some embodiments, is present in a coating composition in an amount ranging from about 70 weight percent to about 90 weight percent on a total solids basis. In some embodiments, a film former is present in a coating composition in an amount ranging from about 60 weight percent to about 80 weight percent on a total solids basis.

In some embodiments, the at least one additional component of a coating composition described herein comprises one or more coupling agents. The selection of a coupling agent may depend on the polymeric resin to be reinforced to enhance compatibility between the resin and glass fibers coated with a coating composition described herein. Additionally, selection of a coupling agent may depend on the type of fiber to be sized. In some embodiments, a coupling does not disturb or substantially disturb the stability of the aqueous dispersion of carbon nanotubes in the coating composition.

In some embodiments, a coupling agent comprises one or more organosilanes. In some embodiments, organosilanes comprise aminosilanes. An aminosilane can comprise any aminosilane for use in sizing compositions known to one of skill in the art. In some embodiments, for example, an aminosilane can comprise aminopropyltrialkoxysilanes such as γ-aminopropyltrimethoxysilane and γ-aminopropyltriethoxysilane, β-aminoethyltriethoxysilane, N-β-aminoethylamino-propyltrimethoxysilane, 3-aminopropyldimethoxysilane, or mixtures thereof.

Non-limiting examples of commercially available aminosilanes include A-1100 γ-aminopropyltriethoxysilane, A-1120 N-(β-aminoethyl)-γ-aminopropyltrimethoxysilane, and other aminofunctional silanes in the A-1100 series from OSi Specialties, as well as DYNASYLAN® AMEO 3-aminopropyltriethoxysilane from Degussa AG of Dusseldorf, Germany.

In some embodiments, organosilanes comprise one or more non-aminofunctional coupling agents. Non-limiting examples of non-aminofunctional coupling agents comprise γ-isocyanatopropyltriethoxysilane, vinyl-trimethoxysilane, vinyl-triethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexyl-ethyltrimethoxysilane, chloropropyltriemethoxysilane, and chloropropyltriethoxysilane.

In some embodiments, a coupling agent is present in a coating composition in an amount of up to about 10 weight percent on a total solids basis. A coupling agent, in some embodiments, is present in a coating composition in an amount of up to about 5 weight percent on a total solids basis. In some embodiments, a coupling agent is present in a coating composition in an amount ranging from about 0.01 weight percent to about 10 weight percent on a total solids basis. A coupling agent, in some embodiments, is present in a coating composition in an amount ranging from about 1 weight percent to about 5 weight percent on a total solids basis.

In some embodiments, the at least one additional component of a coating composition described herein comprises one or more lubricants. Any lubricant not inconsistent with the objectives of the present invention can be used. In some embodiments, a lubricant does not disturb or substantially disturb the stability of the aqueous dispersion of carbon nanotubes in the coating composition.

Lubricants can be used, for example, in sizing compositions of the present invention to assist with internal lubrication (e.g., fiber-to-fiber abrasion) and to assist with external lubrication (e.g., glass-to-contact point abrasion). In some embodiments, the at least one lubricant may comprise at least one cationic lubricant. In other embodiments, the at least one lubricant may comprise at least one non-ionic lubricant. In a further embodiment, the at least one lubricant may comprise at least one cationic lubricant and at least one nonionic lubricant.

Cationic lubricants may be used in embodiments of the present invention, for example, to assist with internal lubrication, such as by reducing filament-to-filament or glass-to-glass abrasion. In general, most cationic lubricants known to those of skill in the art can be used in embodiments of the present invention. Non-limiting examples of cationic lubricants suitable for use in sizing compositions of the present invention include lubricants with amine groups, lubricants with ethoxylated amine oxides, and lubricants with ethoxylated fatty amides. A non-limiting example of a lubricant with an amine group is a modified polyethylenimine, e.g. EMERY 6717, which is a partially amidated polyethylenimine commercially available from Pulcra Chemicals of Charlotte, N.C. Another example of a cationic lubricant useful in embodiments of the present invention is ALUBRASPIN 226, which is a partially amidated polyethylenimine commercially available from BASF Corp. of Parsippany, N.J.

In some embodiments, a lubricant comprises one or more partial esters of a branched carboxylic acid copolymer. The partial ester and derivatives thereof are polymers with pendant hydrocarbon and ethoxylated ester chains. A commercially available version of a suitable partial ester of a branched carboxylic acid copolymer is that from Akzo Chemie America of Chicago, Ill. under the trade designation Ketjenlube 522 partial ester. (formerly sold as DAPRAL® GE 202 partial ester.)

Non-ionic lubricants, in some embodiments, comprise at least one wax. Examples of waxes suitable for use in the present invention include polyethylene wax, paraffin wax, polypropylene wax, microcrystalline waxes, and oxidized derivatives of these waxes. One example of a polyethylene wax suitable for use in the present invention is Protolube HD-A, which is a high density polyethylene wax commercially available from Bayer Corporation of Pittsburgh, Pa. An example of a paraffin wax suitable in embodiments of the present invention is Elon PW, which is a paraffin wax emulsion commercially available from Elon Specialties of Concord, N.C.

In some embodiments, a lubricant is present in a coating composition in an amount of up to about 3 weight percent on a total solids basis. A lubricant, in some embodiments, is present in a coating composition in an amount of up to about 2.5 weight percent on a total solids basis. In some embodiments, a lubricant is present in a coating composition in an amount ranging from about 0.01 weight percent to about 5 weight percent on a total solids basis. A lubricant, in some embodiments, is present in an amount ranging from about 0.5 weight to about 1.5 weight percent on a total solids basis.

In some embodiments, the at least one additional component of a coating composition described herein comprises one or more surfactants. Any surfactant not inconsistent with the objectives of the present invention can be used. In some embodiments, a surfactant does not disturb or substantially disturb the stability of the aqueous dispersion of carbon nanotubes in the coating composition.

In some embodiments, a surfactant is present in a coating composition in an amount of up to about 3 weight percent on a total solids basis. A surfactant, in some embodiments, is present in a coating composition in an amount of up to about 2 weight percent on a total solids basis. In some embodiments, a surfactant is present in a coating composition in an amount ranging from about 0.01 weight percent to about 4 weight percent on a total solids basis. A surfactant, in some embodiments, is present in an amount ranging from about 0.5 weight to about 2 weight percent on a total solids basis.

In some embodiments, the at least one additional component of a coating composition described herein comprises one or more anti-foaming agents. Any anti-foaming agent not inconsistent with the objectives of the present invention can be used. In some embodiments, an anti-foaming agent does not disturb or substantially disturb the stability of the aqueous dispersion of carbon nanotubes in the coating composition. In some embodiments, an antifoaming agent comprises Sag 10 from Momentive Performance Materials.

In some embodiments, an anti-foaming agent is present in a coating composition in an amount of up to about 0.1 weight percent on a total solids basis. An anti-foaming agent, in some embodiments, is present in a coating composition in an amount of up to about 0.05 weight percent on a total solids basis. In some embodiments, an antifoaming agent is present in a coating composition in an amount ranging from about 0.001 weight percent to about 0.02 weight percent on a total solids basis. An antifoaming agent, in some embodiments, is present in an amount ranging from about 0.005 weight to about 0.01 weight percent on a total solids basis.

As described herein, in some embodiments, the at least one additional component comprises various combinations of one or more film formers, coupling agents, lubricants, surfactants, anti-foaming agent and/or biocides.

IV. Methods of Making Coating Compositions for Glass Fibers

In another aspect, the present invention provides methods of making coating compositions for glass fibers. In some embodiments, a method of making a coating composition for glass fibers comprises providing an aqueous dispersion comprising carbon nanotubes comprises and a polymeric carrier. In some embodiments, an aqueous dispersion comprising carbon nanotubes and a polymeric carrier is provided according to the same described in Section II hereinabove. Carbon nanotubes and polymeric carriers used in the present methods, in some embodiments, can comprise any of the same described herein.

In some embodiments, a method of making a coating composition for glass fibers further comprises providing at least one additional component and adding the at least one additional component to the aqueous dispersion comprising carbon nanotubes and a polymeric carrier. In some embodiments, at least one additional component comprises one or more film formers, coupling agents, lubricants, surfactants, biocides or anti-foaming agents of combinations thereof. In some embodiments, the at least one additional component comprises one or more of the film formers, coupling agents, lubricants, surfactants, biocides or anti-foaming agents described in Section III hereinabove.

A solution of the at least one additional component, in some embodiments, is combined with the aqueous dispersion of carbon nanotubes and a polymeric carrier. In some embodiments, the solution of the at least one additional component is combined with the aqueous dispersion of carbon nanotubes and a polymeric carrier with mechanical agitation such as stirring and/or high shear for a time period of at least about 10 minutes. In some embodiments, the solution of the at least one additional component is combined with the aqueous dispersion of carbon nanotubes and a polymeric carrier with mechanical agitation such as stirring and/or high shear for a time period of at least about 20 minutes.

V. Fiber Glass Strands

In another aspect, embodiments of the present invention provide fiber glass strands comprising an electrically conductive structure. Fiber glass strands of the present invention, in some embodiments, can be used in polymeric resin reinforcement applications in the production of electrically conductive polymeric composite materials. Fiber glass strands described herein can comprise any type of glass fibers, and persons of ordinary skill in the art can readily identify a variety of potential glass fibers based on the present disclosure and the desired fiber glass strand, composite, or end product.

Some embodiments of electrically conductive polymeric composite materials of the present invention find application in a variety of fields which demand materials having high mechanical performance coupled with the ability to resist or dissipate static charge accumulation on surfaces or in the bulk of the materials. Electrically conductive polymeric composite materials, for example, can be used in the storage and transport of flammable materials, such as in fuel pipes and fuel containers. Moreover, some embodiments of electrically conductive polymeric composite materials of the present invention can find application in device housings requiring electromagnetic interference (EMI) or radio frequency interference (RFI) shielding.

In some embodiments, the present invention provides a fiber glass strand comprising an electrically conductive structure, the electrically conductive structure comprising one or more glass fibers coated with a coating composition described herein, the fiber glass strand having an electrical resistivity ranging form about 0.1 k$\Omega$·cm$^{-1}$ to about 20 M$\Omega$·cm$^{-1}$. In some embodiments, a coating composition of a fiber glass strand having an electrically conductive structure comprises any of the same described in Section III hereinabove.

While embodiments of the present invention characterize the one or more fibers as being "coated" with a coating composition, the use of the word "coated" is intended to cover embodiments in which the coating composition does not cover a surface of one or more fibers.

In some embodiments, the fiber glass strand can have an electrical resistivity provided in Table 2.

TABLE 2

Electrical Resistivity of Fiber Glass Strand

| |
| --- |
| ≤20 M$\Omega$·cm$^{-1}$ |
| ≤15 M$\Omega$·cm$^{-1}$ |
| ≤10 M$\Omega$·cm$^{-1}$ |
| ≤5 M$\Omega$·cm$^{-1}$ |
| ≤1 M$\Omega$·cm$^{-1}$ |
| ≤0.1 M$\Omega$·cm$^{-1}$ |
| ≤0.8 M$\Omega$·cm$^{-1}$ |
| ≤0.5 M$\Omega$·cm$^{-1}$ |
| ≤0.1 M$\Omega$·cm$^{-1}$ |
| ≤50 k$\Omega$·cm$^{-1}$ |
| ≤30 k$\Omega$·cm$^{-1}$ |
| ≤20 k$\Omega$·cm$^{-1}$ |
| ≤10 k$\Omega$·cm$^{-1}$ |
| ≤1 k$\Omega$·cm$^{-1}$ |
| ≤0.75 k$\Omega$·cm$^{-1}$ |
| ≤0.5 k$\Omega$·cm$^{-1}$ |
| ≤0.1 k$\Omega$·cm$^{-1}$ |

In some embodiments, a fiber glass strand comprising an electrically conductive structure has an electrical resistivity ranging from about 0.5 k$\Omega$·cm$^{-1}$ to about 1 M$\Omega$·cm$^{-1}$. In some embodiments, a fiber glass strand comprising an electrically conductive structure has an electrical resistivity ranging from about 10 k$\Omega$·cm$^{-1}$ to about 0.75 M$\Omega$·cm$^{-1}$. In some embodiments, a fiber glass strand comprising an electrically conductive structure has an electrical resistivity ranging from about 10 k$\Omega$·cm$^{-1}$ to about 0.75 M$\Omega$·cm$^{-1}$. In some embodiments, a fiber glass strand comprising an electrically conductive structure has an electrical resistivity ranging from about 20 kΩ·cm$^{-1}$ to about 0.5 MΩ·cm$^{-1}$.

Moreover, in some embodiments, a fiber glass strand can have a volume resistivity ranging from about 2 Ω·cm to about 0.1 MΩ·cm. In some embodiments, a fiber glass strand can have an volume resistivity provided in Table 3.

TABLE 3

| Volume Resistivity of Fiber Glass Strand |
|---|
| ≤0.1 MΩ · cm |
| ≤0.05 MΩ · cm |
| ≤0.01 MΩ · cm |
| ≤1 kΩ · cm |
| ≤750 Ω · cm |
| ≤500 Ω · cm |
| ≤250 Ω · cm |
| ≤100 Ω · cm |
| ≤75 Ω · cm |
| ≤50 Ω · cm |
| ≤20 kΩ · cm |
| ≤15 Ω · cm |
| ≤10 Ω · cm |
| ≤5 Ω · cm |
| ≤3 Ω · cm |

In some embodiments, a fiber glass strand comprising an electrically conductive structure has an volume resistivity ranging from about 0.1 Ω·cm to about 10 kΩ·cm. In some embodiments, a fiber glass strand comprising an electrically conductive structure has an volume resistivity ranging from about 0.2 Ω·cm to about 20 Ω·cm. In some embodiments, a fiber glass strand comprising an electrically conductive structure has a volume resistivity ranging from about 5 Ω·cm to about 0.5 Ω·cm. In some embodiments, a fiber glass strand comprising an electrically conductive structure has a volume resistivity ranging from about 10 Ω·cm to about 100 Ω·cm$^{-1}$. In some embodiments, a fiber glass strand comprising an electrically conductive structure has a volume resistivity ranging from about 20 Ω·cm to about 80 Ω·cm.

In some embodiments, the electrically conductive structure of a fiber glass strand comprises a plurality of glass fibers coated with a coating composition described herein comprising carbon nanotubes in a polymeric carrier. In some embodiments, the coating composition comprises at least one additional component.

In some embodiments wherein a coating composition comprising carbon nanotubes in a polymeric carrier is applied to fiber glass strands, components of a primary and/or secondary sizing composition of the glass fibers constituting the strand can be selected based on a number of factors. For example, the primary and/or secondary sizing composition components can be selected based on a component's ability to enhance compatibility with the coating composition comprising carbon nanotubes in a polymeric carrier. Moreover, components of the primary and/or secondary sizing composition, in some embodiments, can be selected to enhance wet out of the coating composition comprising carbon nanotubes in a polymeric carrier when the coating composition is applied to the fiber glass strand. Components of the primary and/or secondary sizing composition can also be selected to assist with processing of the glass fibers (e.g., to reduce fuzz, broken filaments, etc.). Non-limiting examples of potential components of a primary and/or secondary sizing composition for use in some embodiments comprise wetting agents, lubricants, surfactants, emulsifiers, coupling agents and/or film formers.

The amount of comprising carbon nanotubes in a polymeric carrier on fiber glass may be measured as "loss on ignition" or "LOI". As used herein, the term "loss on ignition" or "LOI" means the weight percent of dried coating composition present on the fiber glass as determined by Equation 1:

$$\text{LOI}=100\times[(W_{dry}-W_{bare})/W_{dry}] \quad \text{(Eq. 1)}$$

wherein $W_{dry}$ is the weight of the fiber glass plus the weight of the coating after drying in an oven at 220° F. (about 104° C.) for 60 minutes, and $W_{bare}$ is the weight of the bare fiber glass after heating the fiber glass in an oven at 1150° F. (about 621° C.) for 20 minutes and cooling to room temperature in a dessicator.

LOI can affect the electrical resistivity of a fiber glass strand in some embodiments of the present invention. In some embodiments, for example, a high LOI can result in an increase in the resistivity of a fiber glass strand of the present invention to a point where the strand is no longer considered electrically conductive. While not wishing to be bound by any theory, it is believed that an amount of composition producing a high LOI can provide sufficient spacing between individual or clusters of carbon nanotubes in the polymeric carrier such that one or more electrically conductive pathways are not created along the glass fibers of the strand. As a result, electrical charge is localized on individual or clusters of carbon nanotubes leading to increases in resistivity.

The potential carbon nanotube spacing problems associated with a high LOI may be exacerbated when the glass fibers are drawn through a die or an orifice to remove excess coating composition. When the coated glass fibers are drawn through a die or an orifice, the individual or clusters of carbon nanotubes can experience shear forces. A large amount of coating composition associated with a high LOI can provide sufficient polymeric carrier volume to permit even further spacing of individual or clusters of carbon nanotubes as a result of the shearing forces.

The foregoing problems associated with high LOI, in some embodiments, can be mitigated by increasing the carbon nanotube concentration in the polymeric carrier. Increasing carbon nanotube concentration, in some embodiments, can increase the probability of contact between individual or clusters of carbon nanotubes in the formation of an electrically conductive structure. A high carbon nanotube concentration can permit lower amounts of coating composition to be applied to glass fibers of a fiber glass strand thereby lowering the LOI. Increases in carbon nanotube concentration, in some embodiments, can be limited by the ability to disperse the carbon nanotubes in the polymeric carrier.

An additional method of mitigating potential problems with high LOI, in some embodiments, is to provide a coating composition wherein carbon nantoubes are highly dispersed in a polymeric carrier. Carbon nanotubes highly dispersed in a polymeric carrier resist the formation of clusters of carbon nanotubes. Clustering of carbon nanotubes can increase the volume of polymeric carrier devoid of carbon nanotubes thereby contributing to the failure to form an electrically conductive structure through nanotubes in contact with one another. Carbon nanotubes highly dispersed throughout a polymeric carrier can reduce the volume of polymeric carrier devoid of carbon nanotubes thereby requiring lower amounts of coating composition in order to provide a glass fiber with an electrically conductive structure.

Moreover, in some embodiments, subjecting the coated glass fibers to shearing forces can facilitate the formation of an electrically conductive structure. Shearing forces, in some embodiments, can align carbon nanotubes and/or spread clusters of carbon nanotubes to provide an electrically conductive structure wherein the carbon nanotubes are in contact with one another. As provided herein, however, the ability of shearing forces to enhance or degrade electrical conductivity of a fiber glass strand of the present invention can be dependent on the amount of carbon nanotubes present in the coating composition relative to the volume of polymeric carrier.

In some embodiments, a fiber glass strand comprising an electrically conductive structure, the electrically conductive structure comprising one or more glass fibers coated with a coating composition comprising carbon nanotubes in a polymeric carrier, has a LOI up to about 25. In other embodiments, an electrically conductive fiber glass strand described herein has a LOI up to about 15. In another embodiment, an electrically conductive fiber glass strand described herein has an LOI up to about 14. In some embodiments, an electrically conductive fiber glass strand described herein has an LOI of at least about 1. In some embodiments, an electrically conductive fiber glass strand described herein has an LOI of at least about 3. In other embodiments, an electrically conductive fiber glass strand described herein has a LOI of at least about 5. In some embodiments, an electrically conductive fiber glass strand described herein has an LOI ranging from about 2 to about 9. In some embodiments, an electrically conductive fiber glass strand described herein has an LOI ranging from about 2.5 to about 6.

While high LOI can adversely increase electrical resistivities of fiber glass strands of the present invention, low LOI can lead to processing problems including fiber glass strand degradation due to broken filaments and frictional forces.

VI. Glass Fiber Reinforced Polymeric Composites

In another aspect, the present invention provides electrically conductive glass fiber reinforced polymeric composites. In some embodiments, electrically conductive glass fiber reinforced polymeric composites comprise thermoplastic composites or thermoset composites. Embodiments of electrically conductive polymeric composites of the present invention comprise a polymeric resin and at least one fiber glass strand comprising an electrically conductive structure, the electrically conductive structure comprising one or more glass fibers coated with a coating composition comprising carbon nanotubes in a polymeric carrier.

In general, various polymeric resins can be used with electrically conductive fiber glass strands of the present invention. The particular resin can be selected based on a number of factors including, for example, the desired strength of the composite, the contemplated end-use of the composite, temperature requirements for the composite, and other factors. In some embodiments, thermoset resins reinforced with electrically conductive glass fiber strands of the present invention comprise epoxy resins, polyester resins, polyimide resins, phenolic resins, allyl resins such as diallyl phthalate and diallyl isophthalate, urea formaldehyde, melamine formaldehyde, cyanates, bismaleimides, polyurethanes, silicones, vinyl esters or urethane acrylic polymers. In some embodiments, thermoplastic resins reinforced with electrically conductive glass fiber strands comprise polyolefins such as polyethylene and polypropylene, polyamides, polyphenylene oxide, polystyrenics and polyesters such as polybutylene terephthalate (PBT) and polyethylene terephthalate (PET).

In some embodiments, thermoplastic resins reinforced with electrically conductive glass fiber strands of the present invention comprise polyarylene sulfides, polyalkyds, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polyolefins, polysiloxanes, polybutadienes, or polyisoprenes.

In some embodiments, fiber glass strands comprising an electrically conductive structure for polymeric reinforcement applications can be continuous strands. The continuous strands can, for example, be wound into a package. Such continuous strands can be used in a number of applications including, for example, winding applications wherein a polymeric composite is fabricated on a mandrel. In some embodiments, a continuous fiber glass strand comprising an electrically conductive structure intersects with itself at one more locations in a polymeric composite material. In some embodiments, a plurality of continuous fiber glass strands comprising an electrically conductive structure intersect with one another at one or more points in a polymeric composite.

While it might be desirable to have a strand that does not break, breaks in strands do occur on occasion, such that it is difficult to supply a literally continuous strand. In today's commercial manufacturing environment, in embodiments where continuous strand is supplied from a package or a plurality of packages, a continuous strand typically has a length between about 40,000 and about 160,000 meters.

In some embodiments, electrically conductive polymeric composites comprising one or more electrically conductive continuous fiber glass strands can have an electrical conductivity greater than an individual electrically conductive continuous fiber glass strand used in the fabrication of the composite.

The electrical conductivity of a polymeric composite can be expressed in a number of ways including, for example, in terms of its volume resistivity and/or its surface resistivity. Unless otherwise indicated, the volume resistivity of a polymeric composite means the volume resistivity according to ASTM D 257-07. In some embodiments, for example, a polymeric composite comprising electrically conductive fiber glass strands of the present invention can have any of the volume resistivity according to ASTM D 257-07 provided in Table 4.

TABLE 4

| Volume Resistivity according to ASTM D 257-07 |
| --- |
| ≤10 MΩ · cm |
| ≤5 MΩ · cm |
| ≤1 MΩ · cm |
| ≤0.5 MΩ · cm |
| ≤0.1 MΩ · cm |
| ≤0.05 MΩ · cm |
| ≤0.02 MΩ · cm |
| ≤0.01 MΩ · cm |
| ≤0.005 MΩ · cm |
| ≤0.002 MΩ · cm |
| ≤0.001 MΩ · cm |

Unless otherwise indicated, the surface resistivity of a polymeric composite means the surface resistivity according to ASTM D 257-07. In some embodiments, a polymeric composite comprising electrically conductive fiber glass strands of the present invention can have any of the surface resistivities according to ASTM D 257-07 provided in Table 5.

TABLE 5

Surface Resistivity according to ASTM D 257-07

≤10 MΩ/sq
≤5 MΩ/sq
≤1 MΩ/sq
≤0.5 MΩ/sq
≤0.25 MΩ/sq
≤0.1 MΩ/sq
≤0.05 MΩ/sq
≤0.02 MΩ/sq
≤0.01 MΩ/sq

In some embodiments, a polymeric composite comprises any desired amount of fiber glass strands of the present invention comprising an electrically conductive structure. In some embodiments, a polymeric composite comprises fiber glass strands comprising an electrically conductive structure in an amount up to about 5 weight percent of the composite. In another embodiment, a polymeric composite comprises fiber glass strands comprising an electrically conductive structure in an amount up to about 4 weight percent of the composite. In some embodiments, a polymeric composite comprises fiber glass strands comprising an electrically conductive structure in an amount of at least about 1 weight percent of the composite. A polymeric composite, in some embodiments, comprises fiber glass strands comprising an electrically conductive structure in an amount of at least about 2 weight percent of the composite.

In some embodiments, an electrically conductive polymeric composite of the present invention further comprises fiber glass strands not having an electrically conductive structure (in addition to the fiber glass strands having an electrically conductive structure). A polymeric composite, in some embodiments, further comprises non-electrically conductive fiber glass strands in an amount up to about 70 weight percent of the composite. In other embodiments, a polymeric composite further comprises non-electrically conductive fiber glass strands in an amount up to about 65 weight percent of the composite. In some embodiments, a polymeric composite further comprises non-electrically conductive fiber glass strands in an amount up to about 55 weight percent of the composite.

As provided herein, some embodiments of electrically conductive polymeric composite materials of the present invention can find application in a variety of fields. For example, some embodiments may be useful in applications demanding materials having high mechanical performance coupled with the ability to resist or dissipate static charge accumulation on surfaces or in the bulk of the materials. Electrically conductive polymeric composite materials, for example, can be used in the storage and transport of flammable materials, such as in fuel pipes and fuel containers. In some embodiments wherein an electrically conductive polymeric composite material of the present invention is used in the storage and/or transport of flammable materials, the electrically conductive polymeric composite material demonstrates a surface resistivity according to ASTM D257-01 that meets or exceeds one or more industrial specifications addressing the transport or storage of flammable materials, such as DNV Classification Note No. 5, Clause 4.2.2 and/or specifications provided by Lloyds of London regarding fiber glass pipes used to handle petroleum products on ships.

In some embodiments, an electrically conductive polymeric composite material of the present invention can be in the form of a pipe. The pipe can be used, for example, in transporting fuels and/or other flammable materials. In some embodiments a pipe constructed from an electrically conductive polymeric composite material of the present invention can have dimensions consistent with BONDSTRAND® 7000 and 7000M fiber glass pipes and fittings commercially available from Ameron International Corporation of Pasadena, Calif. Such fiber glass pipes, for example, might have the following dimensions.

| Nominal Pipe Size (mm) | Length (m) |
|---|---|
| 25-40 | 3.0 |
| 50-200 | 9.1 |
| 250-400 | 6.1 |
| 450-1000 | 12.2 |

In some embodiments, a pipe constructed from an electrically conductive polymeric composite material of the present invention has an electrical resistance according to ASTM F1173-01 provided in Table 6.

TABLE 6

Electrical Resistance according to ASTM F1173-01

≤1 MΩ/m
≤0.5 MΩ/m
≤0.3 MΩ/m
≤0.1 MΩ/m

Some embodiments of electrically conductive polymeric composite materials of the present invention can also find application in device housings requiring electromagnetic interference (EMI) shielding or radio frequency interference (RFI) shielding.

In another aspect, the present invention provides methods of making a fiber glass strand comprising an electrically conductive structure, the electrically conductive structure comprising one or more glass fibers coated with a coating composition comprising carbon nanotubes in a polymeric carrier. In one embodiment, a method of making a fiber glass strand of the present invention comprises providing a coating composition comprising carbon nanotubes in a polymeric carrier, drawing a fiber glass strand through the coating composition, removing excess coating composition from the fiber glass strand and drying the fiber glass strand. In some embodiments of methods of making fiber glass strands comprising an electrically conductive structure, a coating composition applied to the fiber glass strands can comprise any of the same described herein, including the coating compositions described in Section III hereinabove. Fiber glass strands suitable for use in methods of the present invention can comprise any type of glass fibers, and persons of ordinary skill in the art can readily identify a variety of potential glass fibers based on the present disclosure and the desired fiber glass strand, composite, or end product.

In some embodiments of methods of making fiber glass strands comprising a conductive structure, the coating composition comprises a dispersion of carbon nanotubes in a polymeric carrier. In some embodiments, a coating composition comprises at least one additional component as described in Section III hereinabove.

As provided herein, dispersion of carbon nanotubes in a polymeric carrier, such as an aqueous polymeric dispersion, can be accomplished by several techniques. For example, carbon nanotubes can be dispersed in a polymeric carrier by mechanical agitation as described in Sections II and IV hereinabove. Moreover, surfactants and other dispersants can be used to assist in the dispersion of carbon nanotubes in a polymeric carrier. In another embodiment, surfaces of the carbon nanotubes can be chemically modified to assist in the dispersion of the carbon nanotubes in a polymeric carrier. Surfactants, dispersants and/or carbon nanotube surface modification, in some embodiments, can be selected according to identity of the polymeric carrier.

A fiber glass strand can be drawn through the coating composition comprising carbon nanotubes in a polymeric carrier at any rate not inconsistent with producing a fiber glass strand having the electrical structure and conductivities described herein. In some embodiments, a fiber glass strand is drawn through the coating composition at any of the rates provided in Table 7.

TABLE 7

| Fiber Glass Stand Drawing Rates (ft/min) |
| --- |
| ≥0.5 |
| ≥1 |
| 1-5 |
| 5-150 |
| 150-300 |
| 300-400 |
| 400-500 |
| ≥500 |

Subsequent to the fiber glass strand being drawn through the coating composition comprising carbon nanotubes in a polymeric carrier, excess coating composition is removed from the fiber glass strand to provide the fiber glass strand with a LOI having a value described herein. Excess coating composition can be removed by a variety of techniques in order to provide a fiber glass strand with a LOI having a value described herein. In one embodiment, for example, excess coating composition can be removed by drawing the coated fiber glass strand through an orifice or die. The proper size of the orifice or die can be determined according to principles known to one of skill in the art such as strand diameter, number of filaments in a strand, drawing speed and/or coating composition viscosity.

In some embodiments, for example, the ratio of the diameter of the die opening to the diameter of the fiber glass strand ranges from about 1.4 to about 2.

In some embodiments, excess coating composition comprising carbon nanotubes in a polymeric carrier removed from a fiber glass strand is returned to the coating composition bath or reservoir through which the fiber glass strand is drawn for use in coating additional fiber glass strands. In some embodiments wherein excess coating composition is returned to the coating composition bath, the excess coating is first combined with an aqueous dispersion comprising a carbon nanotube concentration higher than that of the coating composition. Combining excess coating composition with such an aqueous dispersion, in some embodiments, can return the carbon nanotube concentration in the excess coating composition to levels consistent with that of the coating composition in the bath or reservoir.

In other embodiments, excess coating composition removed from fiber glass strands is not returned to the coating composition bath or reservoir and is instead captured in a container separate from the coating composition bath or reservoir. In such embodiments, the removed excess coating composition is not recombined with the coating composition bath or reservoir for coating additional fiber glass strands. Embodiments wherein removed excess coating composition is not recombined with the coating composition bath contemplate any method of keeping the removed excess coating composition separate from the coating composition bath.

In some embodiments, excess coating composition that is removed from a fiber glass strand and recombined with the coating composition bath can increase the electrical resistivity of fiber glass strands drawn through the bath subsequent to the recombination. While not wishing to be bound by any theory, it is believed that recombining removed excess coating composition with the coating composition bath or reservoir reduces the concentration of carbon nanotubes in the bath or reservoir. In some embodiments, carbon nanotubes adhere to glass fibers when a coating composition of the present invention is applied to a fiber glass strand. As a result of this adherence, excess removed coating composition can have a lower concentration of carbon nanotubes.

When the removed coating composition is recombined with the coating composition bath or reservoir, the removed coating composition can dilute the carbon nanotube concentration in the bath. The reduction in carbon nanotube concentration can become significant over extended periods of time as additional coating composition is removed from a fiber glass strand and returned to the bath or reservoir. Consequently, glass fibers drawn though the coating composition in a bath having a reduced carbon nanotube concentration receive less carbon nanotubes, which thereby inhibits or precludes the formation of one or more electrically conductive pathways along the glass fibers. The absence of electrically conductive pathways can increase charge localization and resistivity.

After removal of excess coating composition comprising carbon nanotubes in a polymeric carrier, the fiber glass strands are dried. In some embodiments, coated fiber glass strands are dried at a temperature ranging from about 120° C. to about 460° C. In some embodiments coated fiber glass strands are dried at a temperature ranging from about 180° C. to about 200° C. In some embodiments, coated fiber glass strands are dried at a temperature ranging from about 240° C. to about 270° C. In another embodiment, coated fiber glass strands are dried at a temperature ranging from about 350° C. to about 400° C. In some embodiments, coated fiber glass strands are dried at a temperature ranging from about 400° C. to about 460° C. In some embodiments, coated fiber glass strands are dried at a temperature less than about 120° C. or greater than about 460° C.

In some embodiments, the drying temperature for the fiber glass strands is selected with reference to the drawing speed of the fiber glass strands. In one embodiment, for example, the drying temperature is directly proportional to the drawing speed of the fiber glass strands.

Moreover, in some embodiments, multiple drying apparatus are used in the drying of fiber glass strands of the present invention. In some embodiments, the coated fiber glass strands are drawn through a plurality of ovens or furnaces. In some embodiments, the plurality of ovens or furnaces are set to the same temperature. In other embodiments, the plurality of ovens or furnaces are set to different temperatures. In embodiments, wherein the plurality of ovens or furnaces are set to different temperatures, the fiber glass strands are subjected to temperature gradients during the drying process.

In another aspect, the present invention provides methods of making a glass fiber reinforced polymeric composite. In one embodiment, a method of making a glass fiber reinforced polymeric composite comprises providing one or more fiber glass strands of the present invention comprising an electrically conductive structure and disposing the one or more fiber glass strands in a polymeric resin. As provided herein, in some embodiments, the fiber glass strands comprising an electrically conductive structure are continuous.

Moreover, in some embodiments, fiber glass strands comprising an electrically conductive structure are combined with non-electrically conductive fiber glass strands in the production of a electrically polymeric composite. Conductive and non-conductive fiber glass strands, in some embodiments, can be combined according to their respective weight percents in a polymeric composite as provided herein.

In some embodiments, a method of making an electrically conductive glass fiber reinforced polymeric composite further comprises curing the polymeric resin.

In some embodiments, electrically conductive fiber glass strands of the present invention and non-electrically conductive fiber glass strands can be disposed in a polymeric resin and wound around a mandrel in the production of an electrically conductive glass fiber reinforced composite. In some embodiments, electrically conductive and non-electrically conductive fiber glass strands are wound around a mandrel in overlapping helical patterns in the production of a polymeric composite as described in U.S. Pat. No. 4,330,811, which is hereby incorporated by reference in its entirety.

Some embodiments of the present invention are further illustrated in the following non-limiting examples.

EXAMPLE 1

Fiber Glass Strand Comprising an Electrically Conductive Structure

A coating composition comprising 1 weight percent SWCNT dispersed in an aqueous polyurethane carrier was provided in a reservoir. The SWCNT were obtained from Carbon Nanotechnologies Inc. of Houston, Tex. and the polyurethane film former was WITCOBOND® W-290H commercially available from Chemtura Corporation of Middlebury, Conn. The foregoing dispersion was obtained from PolyOne Corporation of Avon Lake, Ohio. A HYBON® 2026 continuous fiber glass strand of 450 yield and 1100 tex commercially available from PPG Industries of Pittsburgh, Pa. was drawn through the coating composition in the reservoir at a rate of 0.75 ft/min to coat glass fibers of the strand with the coating composition. The fiber glass strand was subsequently drawn through a die to remove excess coating composition. The excess coating composition removed from the fiber glass strand was collected in a container separate from the coating composition reservoir. As a result, the excess coating composition removed from the fiber glass strand was not returned to the coating composition reservoir.

The continuous glass fiber strand was then dried by passing through a first furnace having a temperature of 180° C. and second furnace having a temperature of 200° C. before being wound onto a package.

The completed fiber glass strand demonstrated a resistivity of 3.4 MΩ·cm$^{-1}$ and volume resistivity of 0.0193 MΩ·cm. The completed fiber glass strand additionally had an LOI of 14.0.

EXAMPLE 2

Electrically Conductive Glass Fiber Reinforced Polymeric Composite 3 continuous fiber glass strands of the present invention made in accordance with Example 1 along with 83 strands of E-glass roving commercially available from PPG under the HYBON® 2006-450 trade designation were drawn through an epoxy resin and wound on a mandrel in accordance with U.S. Pat. No. 4,330,811 to produce an electrically conductive glass fiber reinforced polymeric composite pipe having a length of 9 m, an inner diameter of 100 mm and a wall thickness of 2 mm. The composite pipe comprised about 63 weight percent glass fibers with 3.3 weight percent of the glass fibers coming from the 3 fiber glass strands produced in accordance with Example 1.

A control glass fiber reinforced polymeric composite pipe having a length of 9 m, an inner diameter of 100 mm and a wall thickness of 2 mm was also produced in accordance with U.S. Pat. No. 4,330,811. The control glass fiber reinforced polymeric composite comprised about 63 weight percent HYBON® 2006-450 glass fibers and no glass fibers produced in accordance with Example 1.

The conductivity of the electrically conductive glass fiber reinforced polymeric composite pipe was tested according the ASTM F1173-01. The results of the electrical conductivity testing are provided in Table 8.

TABLE 8

| Electrical Conductivity According to ASTM F1173-01 | | |
|---|---|---|
| 1 m of Pipe | Test Voltage (V) | Resistance (MΩ/m) |
| Inner Diameter to Inner Diameter of Pipe | 485 | 0.238 |
| Inner Diameter to Outer Diameter of Pipe | 508 | 0.276 |
| Outer Diameter to Outer Diameter of Pipe | 504 | 0.318 |

The surface resistivities of the electrically conductive glass fiber reinforced polymeric composite pipe were additionally measured and compared with the surface resistivities of the control glass fiber reinforced pipe. The surface resistivities of the electrically conductive fiber glass reinforced polymeric composite pipe and the control glass fiber reinforced pipe were measured in accordance with ASTM D257-01. The results are provided in Table 9.

TABLE 9

| Surface Resistivities | | |
|---|---|---|
| Measurement Location | Test Voltage (V) | Surface Resistivity (Ω/sq) |
| Outside Surface of SWCNT/FG Pipe | 287 | $1.27E^6$ |
| Inside Surface of SWCNT/FG Pipe | 22 | $2.4E^5$ |
| Outside Surface of Control Pipe | 8,000 | $>1.7E^{14}$ |

By demonstrating outside and inside surface resistivities according to ASTM D257-01 of $1.27 E^6$ and $2.4 E^5$ respectively, the electrically conductive fiber glass reinforced polymeric composite pipe exceeds the requirements of DNV Classification Note No. 5, Clause 4.2.2 requiring the surface resistivity of pipes used gas dangerous spaces be less than $1E^7$ according to ASTM D257-01. Additionally, the surface resistivities of the electrically conductive fiber glass reinforced polymeric composite pipe of the present example exceed the surface resistivity requirements of Lloyds of London regarding fiber glass pipes handling petroleum products on board a ship by at least two (2) orders of magnitude. Lloyds of London, for example, requires the surface resistivity of a fiber glass pipe handling petroleum products on board a ship to be less than $1E^9$ according to ASTM D257-01.

The volume resistivities of the electrically conductive glass fiber reinforced polymeric composite pipe were additionally measured and compared with the volume resistivities of the control glass fiber reinforced pipe. The volume resistivities of the electrically conductive glass fiber reinforced polymeric composite pipe and the control pipe were measured in accordance with ASTM D257-01.

Sample pipe preparation for measurement of volume resistivity according to ASTM D257-01 was administered as follows. A 1 meter length of pipe was cut. Each fresh cut end of the pipe was polished and cleaned with alcohol. Aluminum contact surfaces were cleaned with alcohol and adhered to each end of the pipe. The adhesive used to adhere the aluminum contacts was a silver epoxy resin with hardener in a 3:1 ratio. The epoxy resin was then cured at 24° C. for 4.5 hours or at 38° C. for 3 hours. The reported volume resistance values were at 500V. The volume resistivity was subsequently calculated according to the formula Volume Resistivity $(\Omega \cdot cm) = R*A/L$ wherein R=resistance ($\Omega$), A=cross-sectional area of the sample, and L is the distance between the 2 aluminum contacts.

The results are provided in Table 10.

TABLE 10

Volume Resistivities

| Composite Pipe | Test Voltage (V) | Volume Resistivity ($\Omega \cdot cm$) |
|---|---|---|
| SWCNT/FG Pipe | 343 V | $1.16E^4$ |
| Control Pipe | 5 kV | $>7E^{13}$ |

As illustrated by the results summarized in Tables IX and X, the glass fiber reinforced polymeric composite pipe of the present invention incorporating continuous fiber glass strands having an electrically conductive structure displayed significantly lower surface and volume resistivities, and concomitantly higher conductivities, in comparison with the control polymeric composite pipe not comprising fiber glass strands having an electrically conductive structure. Moreover, the glass fiber reinforced polymeric composite pipe of the present invention exhibited significantly higher conductivities with only about 0.0034 weight percent of SWCNT present in the composite.

The mechanical properties of an electrically conductive glass fiber reinforced polymeric composite pipe were additionally measured and compared with the mechanical properties of a control glass fiber reinforced pipe fabricated as described in the present Example. The horizontal shear strengths of the electrically conductive fiber glass reinforced polymeric composite pipe and the control pipe were measured in accordance with ASTM D2344. The results are provided in Table 11.

TABLE 11

Horizontal Shear Strength

| Composite Pipe | Horizontal Shear Strength (ASTM D2344) | Fiber Glass Content (ISO 1172) |
|---|---|---|
| SWCNT/FG Pipe | 4.3-4.92 kpsi | 74.9 |
| Control Pipe | 3.75-4.36 kpsi | 74.7 |

In view of the conductivity testing administered according to ASTM F1173-01, a glass fiber reinforced polymeric composite pipe of the present invention incorporating continuous fiber glass strands having an electrically conductive structure meets the requirements for conductive piping systems in marine applications. Moreover, a glass fiber reinforced polymeric composite pipe of the present invention demonstrates one or more mechanical properties at least equal to mechanical properties of existing pipe structures. As a result, glass reinforced polymeric composite pipes of the present invention have the potential to replace existing electrically conductive pipes which incorporate expensive conductive materials such as continuous carbon fiber strands.

EXAMPLE 3

Preparation of Aqueous Dispersion of Carbon Nanotubes

An aqueous dispersion of carbon nanotubes was prepared according to the following procedure. A polymeric carrier comprising an aqueous dispersion of PVP was obtained from International Specialty Products under the PVP K15 trade designation. MWCNTs were obtained from Bayer Material Science under the BAYTUBES® C 150 HP trade designation. A blend of the PVP K15 solution and MWCNT made at 11.7 wt. % MWCNT to resin solids was prepared in a glove bag. 25% of the initial charge of PVP resin was held out to rinse the glove bag upon transfer of the PVP/MWCNT blend to a recycle tank. An additional 25% of the initial charge of PVP resin was added to the recycle tank. The PVP/MWCNT blend was removed from the glove bag and placed into the recycle tank.

The PVP/MWCNT blend was mixed in the recycle tank for a period of 10 minutes using a Ross ME400 DLA in line mixer-emulsifier with the rotor-stator set at 7000 rpm. The paste outlet of the rotor-stator was set to less than 77° F. A visual evaluation of the PVP/MWCNT aqueous dispersion was conducted by examining the softness of the MWCNT granules on a substrate.

The PVP/MWCNT aqueous dispersion was moved to a new tank for milling. A Premier HM-1.5 horizontal media mill with 75% loading of 1.2-1.7 mm Zirconox grinding media was used to mill the PVP/MWCNT blend. The mill ran at 2400 feet per minute tip speed and 22.5 gallon/hr flow rate. A Hegman grind bar was used to check reduction in particle size of the PVP/MWCNT aqueous dispersion. Milling was continued until a Hegman reading of 8 was achieved. In some batches, a viscosity modifier of PVP K30 Solution A was added to the PVP/MWCNT aqueous dispersion to maintain a desirable rheology during milling.

EXAMPLE 4

Aqueous Dispersion Comprising Carbon Nanotubes

The aqueous dispersion of Table 12 was made in accordance with the procedures of Example 3.

TABLE 12

Aqueous Dispersion of Carbon Nanotubes

| Ingredient | Weight % Solids |
|---|---|
| MWCNT[1] | 10.49 |
| Polyvinylpyrrolidone Solution[2] | 89.51 |

[1]BAYTUBES ® C 150 HP - Bayer Material Science
[2]PVP K15

Viscosity characteristics of the aqueous dispersion of Table 12 are provided in Table 13.

TABLE 13

Viscosity of Aqueous Dispersion of Carbon Nanotubes

| RPM | 0.5 | 1 | 2.5 | 5 | 10 | 20 | 50 | 100 |
|---|---|---|---|---|---|---|---|---|
| cP | 2778 | 2679 | 1905 | 1290 | 814 | 551 | 335 | 251 |

EXAMPLE 5

Aqueous Dispersion Comprising Carbon Nanotubes

The aqueous dispersion of Table 14 was made in accordance with the procedures of Example 3.

TABLE 14

Aqueous Dispersion of Carbon Nanotubes

| Ingredient | Weight % Solids |
|---|---|
| MWCNT[3] | 14.71 |
| Polyvinylpyrrolidone Solution[4] | 85.29 |

[3]BAYTUBES ® C 150 HP - Bayer Material Science
[4]PVP K15

Viscosity characteristics of the aqueous dispersion of Table 14 are provided in Table 15.

TABLE 15

Viscosity of Aqueous Dispersion of Carbon Nanotubes

| RPM | 0.5 | 1 | 2.5 | 5 | 10 | 20 | 50 | 100 |
|---|---|---|---|---|---|---|---|---|
| cP | 6549 | 6549 | 5239 | 4286 | 3304 | 2495 | 1709 | EEE |

EXAMPLE 6

Fiber Glass Strands Comprising an Electrically Conductive Structure

A coating composition of Table 16 was prepared by diluting an aqueous PVP/MWCNT dispersion prepared in accordance with the procedures of Example 3. The coating composition in Table 16 had 30 weight percent solids.

TABLE 16

Glass Fiber Coating Composition

| Ingredient | Weight % Solids |
|---|---|
| MWCNT[5] | 1.0 |
| Polyvinylpyrrolidone Solution[6] | 99.0 |

[5]BAYTUBES ® C 150 HP - Bayer Material Science
[6]PVP K15

The coating composition was applied to two HYBON® 2026 continuous fiber glass strands (450 yield and 1100 tex) commercially available from PPG Industries of Pittsburgh, Pa. The continuous fiber glass strands were drawn through the coating composition in a reservoir at a rate of 0.5 ft/min and through a die opening. The ratio of the die opening to the diameter of the fiber glass strand was within 1.4-2. Glass fiber strand 1 was dried by passing through a first furnace having a temperature of 180° C. and a second furnace having a temperature of 200° C. Glass fiber strand 2 was dried by passing through a first furnace having a temperature of 240° C. and a second furnace having a temperature of 260° C. Electrical properties of the coated fiber glass strands are provided in Table 17.

TABLE 17

Coated Fiber Glass Strand Properties

| Fiber Glass Strand | LOI % | Strand Linear Resistivity (kΩ/cm) | Stand Volume Resistivity (kΩ · cm) |
|---|---|---|---|
| 1 | 6.73 | 1.46 E$^4$ | 8.29E$^1$ |
| 2 | 7.20 | 8 E$^1$ | 4.54E$^{-1}$ |

EXAMPLE 7

Fiber Glass Strands Comprising an Electrically Conductive Structure

A coating composition of Table 18 was prepared by combining the listed ingredients with an aqueous PVP/MWCNT dispersion prepared in accordance with the procedures of Example 3. The coating composition in Table 18 had 15.5 weight percent solids.

TABLE 18

Glass Fiber Coating Composition

| Ingredient | Weight % Solids |
|---|---|
| MWCNT[7] | 3.00 |
| Polyvinylpyrrolidone Solution[8] | 25.05 |
| Polyvinylpyrrolidone Solution[9] | 21.15 |
| Epoxy Emulsion[10] | 43.77 |
| Ester Resin[11] | 1.47 |
| Coupling Agent[12] | 3.21 |
| Coupling Agent[13] | 2.12 |
| Lubricant[14] | 0.21 |
| Defoaming Agent[15] | 0.02 |

[7]BAYTUBES ® C 150 HP - Bayer Material Science
[8]PVP K15 Solution - International Specialty Products
[9]PVP K30 Solution - International Specialty Products
[10]K80-203 - Franklin Adhesives and Polymers
[11]PEG-600ML - Stepan Chemical Company
[12]3-methacryloxypropyltrimethoxysilane - SCA 503 from Huarong New Chemical Materials
[13]3-glycidoxypropyltrimethoxysilane - GLYMO from Sivento Inc. DeGussa
[14]Polyethyleneimine - Emery 6717L from Pulcra Chemicals
[15]Silicon Emulsion - Sag 10 from Chemtura, Inc.

The coating composition of Table 18 was applied to a HYBON® 2026 continuous fiber glass strands (450 yield and 1100 tex) commercially available from PPG Industries of Pittsburgh, Pa. Coating composition application conditions and the resulting electrical properties of the coated fiber glass strand are provided in Table 19. For examples provided herein, recitation of more than one drying temperature indicates the glass fiber strand was passed through a plurality of ovens of the temperatures recited.

TABLE 19

Coated Fiber Glass Strand Properties

| Fiber Glass Strand | Draw Speed through Coating Composition (ft/min) | Ratio of die opening to diameter of fiber glass strand | LOI % | Drying temperature (C. °) | Strand Linear Resistivity (kΩ/cm) | Stand Volume Resistivity (kΩ · cm) |
|---|---|---|---|---|---|---|
| 1 | 100 | 1.4-2 | 1.88 | 372/372/372 | 6.86E[1] | 3.89E[−1] |

EXAMPLE 8

Fiber Glass Strands Comprising an Electrically Conductive Structure

A coating composition of Table 20 was prepared by combining the listed ingredients with an aqueous PVP/MWCNT dispersion prepared in accordance with the procedures of Example 3. The coating composition of Table 20 had 15.5 weight percent solids.

TABLE 20

Glass Fiber Coating Composition

| Ingredient | Weight % Solids |
|---|---|
| MWCNT[16] | 3.00 |
| Polyvinylpyrrolidone Solution[17] | 25.05 |
| Polyvinylpyrrolidone Solution[18] | 21.15 |
| Epoxy Emulsion[19] | 43.77 |
| Ester Resin[20] | 1.47 |
| Coupling Agent[21] | 3.21 |
| Coupling Agent[22] | 2.12 |
| Lubricant[23] | 0.23 |

[16]BAYTUBES ® C 150 HP - Bayer Material Science
[17]PVP K15 Solution - International Specialty Products
[18]PVP K30 Solution - International Specialty Products
[19]K80-203 - Franklin Adhesives and Polymers
[20]PEG-600ML - Stepan Chemical Company
[21]3-methacryloxypropyltrimethoxysilane - SCA 503 from Huarong New Chemical Materials
[22]3-glycidoxypropyltrimethoxysilane - GLYMO from Sivento Inc. DeGussa
[23]Polyethyleneimine - Emery 6717L from Pulcra Chemicals The coating composition of Table 20 was applied to three HYBON® 2026 continuous fiber glass strands (450 yield and 1100 tex) commercially available from PPG Industries of Pittsburgh, Pa. Coating composition application conditions and the resulting electrical properties of the three coated fiber glass strands are provided in Table 21.

TABLE 21

Coated Fiber Glass Strand Properties

| Fiber Glass Strand | Draw Speed through Coating Composition (ft/min) | Ratio of die opening to diameter of fiber glass strand | LOI % | Drying temperature (C. °) | Strand Linear Resistivity (kΩ/cm) | Stand Volume Resistivity (kΩ · cm) |
|---|---|---|---|---|---|---|
| 1 | 6 | 1.4-2 | 8.36 | 390/390 | 2.59E[1] | 1.47E[−1] |
| 2 | 6 | 1.4-2 | 4.84 | 390/390 | 1.57E[1] | 8.91E[−2] |
| 3 | 6 | 1.4-2 | 3.10 | 440/390 | 3.84 | 2.18E[−2] |

EXAMPLE 9

Fiber Glass Strands Comprising an Electrically Conductive Structure

A coating composition of Table 22 was prepared by combining the listed ingredients with an aqueous PVP/MWCNT dispersion prepared in accordance with the procedures of Example 3. The coating composition of Table 22 had 11.5 weight percent solids.

TABLE 22

Glass Fiber Coating Composition

| Ingredient | Weight % Solids |
|---|---|
| MWCNT[24] | 3.00 |
| Polyvinylpyrrolidone Solution[25] | 25.05 |
| Polyvinylpyrrolidone Solution[26] | 21.15 |
| Epoxy Emulsion[27] | 43.77 |
| Ester Resin[28] | 1.47 |
| Coupling Agent[29] | 3.21 |
| Coupling Agent[30] | 2.12 |
| Lubricant[31] | 0.23 |

[24]BAYTUBES ® C 150 HP - Bayer Material Science
[25]PVP K15 Solution - International Specialty Products
[26]PVP K30 Solution - International Specialty Products
[27]K80-203 - Franklin Adhesives and Polymers
[28]PEG-600ML - Stepan Chemical Company
[29]3-methacryloxypropyltrimethoxysilane - SCA 503 from Huarong New Chemical Materials
[30]3-glycidoxypropyltrimethoxysilane - GLYMO from Sivento Inc. DeGussa
[31]Polyethyleneimine - Emery 6717L from Pulcra Chemicals The coating composition of Table 22 was applied to a HYBON® 2026 continuous fiber glass strands (450 yield and 1100 tex) commercially available from PPG Industries of Pittsburgh, Pa. Coating composition application conditions and the resulting electrical properties of the three coated fiber glass strands are provided in Table 23.

TABLE 23

Coated Fiber Glass Strand Properties

| Fiber Glass Strand | Draw Speed through Coating Composition (ft/min) | Ratio of die opening to diameter of fiber glass strand | LOI % | Drying temperature (C. °) | Strand Linear Resistivity (kΩ/cm) | Stand Volume Resistivity (kΩ · cm) |
|---|---|---|---|---|---|---|
| 1 | 6 | 1.4-2 | 1.88 | 440/390 | 6.77 | $3.84E^{-2}$ |

EXAMPLE 10

Fiber Glass Strands Comprising an Electrically Conductive Structure

A coating composition of Table 24 was prepared by combining the listed ingredients with an aqueous PVP/MWCNT dispersion prepared in accordance with the procedures of Example 3. The coating composition of Table 24 had 11.5 weight percent solids.

TABLE 24

Glass Fiber Coating Composition

| Ingredient | Weight % Solids |
|---|---|
| MWCNT[32] | 3.49 |
| Polyvinylpyrrolidone Solution[33] | 29.08 |
| Polyvinylpyrrolidone Solution[34] | 24.89 |
| Epoxy Emulsion[35] | 35.13 |
| Coupling Agent[36] | 2.33 |
| Coupling Agent[37] | 0.94 |
| Coupling Agent[38] | 0.78 |
| Ester Resin[39] | 1.19 |
| Lubricant[40] | 0.13 |
| Lubricant[41] | 2.05 |

[32]BAYTUBES ® C 150 HP - Bayer Material Science
[33]PVP K15 Solution - International Specialty Products
[34]PVP K30 Solution - International Specialty Products
[35]K80-203 - Franklin Adhesives and Polymers
[36]3-glycidoxypropyltrimethoxysilane - GLYMO from Sivento Inc. DeGussa
[37]Dynasylan PTMO
[38]3-aminopropyltriethoxysilane - AMEO from DeGussa
[39]PEG-600ML - Stepan Chemical Company
[40]Polyethyleneimine - Emery 6717L from Pulcra Chemicals
[41]Organomodified Polydimethylsiloxane Emulsion - CoatOSil 9300 from Momentive Performance Materials The coating composition of Table 24 was applied to three HYBON® 2026 continuous fiber glass strands (450 yield and 1100 tex) commercially available from PPG Industries of Pittsburgh, Pa. Coating composition application conditions and the resulting electrical properties of the three coated fiber glass strands are provided in Table 25.

EXAMPLE 11

Fiber Glass Strands Comprising an Electrically Conductive Structure

A coating composition of Table 26 was prepared by combining the listed ingredients with an aqueous PVP/MWCNT dispersion prepared in accordance with the procedures of Example 3. The coating composition of Table 26 had 9.5 weight percent solids.

TABLE 26

Glass Fiber Coating Composition

| Ingredient | Weight % Solids |
|---|---|
| MWCNT[42] | 3.49 |
| Polyvinylpyrrolidone Solution[43] | 29.08 |
| Polyvinylpyrrolidone Solution[44] | 24.89 |
| Epoxy Emulsion[45] | 35.13 |
| Coupling Agent[46] | 2.33 |
| Coupling Agent[47] | 0.94 |
| Coupling Agent[48] | 0.78 |
| Ester Resin[49] | 1.19 |
| Lubricant[50] | 0.13 |
| Lubricant[51] | 2.05 |

[42]BAYTUBES ® C 150 HP - Bayer Material Science
[43]PVP K15 Solution - International Specialty Products
[44]PVP K30 Solution - International Specialty Products
[45]K80-203 - Franklin Adhesives and Polymers
[46]3-glycidoxypropyltrimethoxysilane - GLYMO from Sivento Inc. DeGussa
[47]Dynasylan PTMO
[48]3-aminopropyltriethoxysilane - AMEO from DeGussa
[49]PEG-600ML - Stepan Chemical Company
[50]Polyethyleneimine - Emery 6717L from Pulcra Chemicals
[51]Organomodified Polydimethylsiloxane Emulsion - CoatOSil 9300 from Momentive Performance Materials The coating composition of Table 26 was applied to a HYBON® 2026 continuous fiber glass strand (450 yield and 1100 tex) commercially available from PPG Industries of Pittsburgh, Pa. Coating composition application conditions and the resulting electrical properties of the coated fiber glass strand are provided in Table 27.

TABLE 25

Coated Fiber Glass Strand Properties

| Fiber Glass Strand | Draw Speed through Coating Composition (ft/min) | Ratio of die opening to diameter of fiber glass strand | LOI % | Drying temperature (C. °) | Strand Linear Resistivity (kΩ/cm) | Stand Volume Resistivity (kΩ · cm) |
|---|---|---|---|---|---|---|
| 1 | 6 | 1.4-2 | 5.69 | 390/390 | $2.22E^{1}$ | $1.26E^{-1}$ |
| 2 | 6 | 1.4-2 | 2.7 | 440/390 | 6.52 | $3.70E^{-2}$ |
| 3 | 0.5 | 1.4-2 | 3.67 | 330/330 | $4.65E^{-1}$ | $2.64E^{-3}$ |

TABLE 27

Coated Fiber Glass Strand Properties

| Fiber Glass Strand | Draw Speed through Coating Composition (ft/min) | Ratio of die opening to diameter of fiber glass strand | LOI % | Drying temperature (C. °) | Strand Linear Resistivity (kΩ/cm) | Stand Volume Resistivity (kΩ · cm) |
|---|---|---|---|---|---|---|
| 1 | 6 | 1.4-2 | 4.36 | 390/390 | $2.71E^1$ | $1.54E^{-1}$ |

EXAMPLE 12

Fiber Glass Strands Comprising an Electrically Conductive Structure

A coating composition of Table 28 was prepared by combining the listed ingredients with an aqueous PVP/MWCNT dispersion prepared in accordance with the procedures of Example 3. The coating composition of Table 28 had 11.5 weight percent solids.

TABLE 28

Glass Fiber Coating Composition

| Ingredient | Weight % Solids |
|---|---|
| MWCNT[52] | 3.0 |
| Polyvinylpyrrolidone Solution[53] | 29.08 |
| Polyvinylpyrrolidone Solution[54] | 24.89 |
| Epoxy Emulsion[55] | 35.13 |
| Coupling Agent[56] | 2.33 |
| Coupling Agent[57] | 0.94 |
| Coupling Agent[58] | 0.78 |
| Ester Resin[59] | 1.19 |
| Lubricant[60] | 0.13 |
| Lubricant[61] | 2.05 |

[52] BAYTUBES ® C 150 HP - Bayer Material Science
[53] PVP K15 Solution - International Specialty Products
[54] PVP K30 Solution - International Specialty Products
[55] K80-203 - Franklin Adhesives and Polymers
[56] 3-glycidoxypropyltrimethoxysilane - GLYMO from Sivento Inc. DeGussa
[57] Dynasylan PTMO
[58] 3-aminopropyltriethoxysilane - AMEO from DeGussa
[59] PEG-600ML - Stepan Chemical Company
[60] Polyethyleneimine - Emery 6717L from Pulcra Chemicals
[61] Organomodified Polydimethylsiloxane Emulsion - CoatOSil 9300 from Momentive Performance Materials The coating composition of Table 28 was applied to two HYBON® 2026 continuous fiber glass strands (450 yield and 1100 tex) commercially available from PPG Industries of Pittsburgh, Pa. Coating composition application conditions and the resulting electrical properties of the coated fiber glass strands are provided in Table 29.

TABLE 29

Coated Fiber Glass Strand Properties

| Fiber Glass Strand | Draw Speed through Coating Composition (ft/min) | Ratio of die opening to diameter of fiber glass strand | LOI % | Drying temperature (C. °) | Strand Linear Resistivity (kΩ/cm) | Stand Volume Resistivity (kΩ · cm) |
|---|---|---|---|---|---|---|
| 1 | 6 | 1.4-2 | 7.38 | 390/390 | $3.55E^2$ | 2.01 |
| 2 | 6 | 1.4-2 | 4.7 | 390/390 | $2.21E^1$ | $1.25E^{-1}$ |

EXAMPLE 13

Fiber Glass Strands Comprising an Electrically Conductive Structure

A coating composition of Table 30 was prepared by combining the listed ingredients with an aqueous RD1135-B/MWCNT dispersion prepared in accordance with the procedures of Example 3. The coating composition of Table 30 had 15.6 weight percent solids.

TABLE 30

Glass Fiber Coating Composition

| Ingredient | Weight % Solids |
|---|---|
| MWCNT[62] | 3.4 |
| Water Soluble Epoxy Resin[63] | 19.53 |
| Polyurethane Emulsion[64] | 77.07 |

[62] BAYTUBES ® C 150 HP - Bayer Material Science
[63] RD 1135-B from Hexion Specialty Chemicals
[64] WITCOBOND W-290H from Chemtura The coating composition of Table 30 was applied to two HYBON® 2026 continuous fiber glass strands (450 yield and 1100 tex) commercially available from PPG Industries of Pittsburgh, Pa. Coating composition application conditions and the resulting electrical properties of the coated fiber glass strands are provided in Table 31.

TABLE 31

Coated Fiber Glass Strand Properties

| Fiber Glass Strand | Draw Speed through Coating Composition (ft/min) | Ratio of die opening to diameter of fiber glass strand | LOI % | Drying temperature (C. °) | Strand Linear Resistivity (kΩ/cm) | Stand Volume Resistivity (kΩ · cm) |
|---|---|---|---|---|---|---|
| 1 | 3 | 1.4-2 | 7.06 | 120-140 | 8.90E$^1$ | 5.05E$^{-1}$ |

Desirable characteristics, which can be exhibited by embodiments of the present invention, can include, but are not limited to, the provision of electrically conductive glass fiber reinforced polymeric composite materials combining desirable mechanical properties with the ability to dissipate and/or resist the accumulation of static electrical charges resulting from use in a variety of applications and environments. Moreover, electrically conductive fiber glass strands of the present invention can provide cost efficient alternatives to more expensive electrically conductive species previously used in the production of conductive glass fiber reinforced polymeric composite materials without sacrifice in mechanical or electrical performance.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. An aqueous carbon nanotube dispersion comprising:
    carbon nanotube particles present in an amount of at least about 1 weight percent on a total solids basis, wherein the carbon nanotube particles comprise a plurality of carbon nanotubes and have a mean particle size that ranges from about 250 nm to about 2 μm; and
    a polymeric carrier, the polymeric carrier comprising an aqueous dispersion of one or more polymeric species;
    wherein the aqueous carbon nanotube dispersion has a viscosity of 1100 to 4500 cP at 5 RPM and 25° C.

2. The aqueous carbon nanotube dispersion of claim 1, wherein the carbon nanotube particles are present in the carbon nanotube dispersion in an amount of at least about 2 weight percent on a total solids basis.

3. The aqueous carbon nanotube dispersion of claim 1, wherein the carbon nanotube particles are present in the carbon nanotube dispersion in an amount of at least about 5 weight percent on a total solids basis.

4. The aqueous carbon nanotube dispersion of claim 1, wherein the carbon nanotube particles are present in the carbon nanotube dispersion in an amount of at least about 10 weight percent on a total solids basis.

5. The aqueous carbon nanotube dispersion of claim 1, wherein the one or more polymeric species comprises a polyvinylpyrrolidone, a polyurethane, an epoxy or combinations thereof.

6. The aqueous carbon nanotube dispersion of claim 1, wherein the carbon nanotubes comprise single-walled carbon nanotubes, multi-walled carbon nanotubes or mixtures thereof.

7. The aqueous carbon nanotube dispersion of claim 1, wherein the aqueous carbon nanotube dispersion has a rating on the Hegman scale of 8.

8. The aqueous carbon nanotube dispersion of claim 1, further comprising at least one additional component, the at least one additional component comprising a film former, a coupling agent, a lubricant, a surfactant, a biocide, an antifoaming agent or mixtures thereof.

9. The aqueous carbon nanotube dispersion of claim 8, wherein the at least one additional component comprises a film former, the film former comprising polyurethane, epoxide, polyvinylpyrrolidone, polyacrylate, polyester, polyvinylacetate, polyvinyl alcohol or combinations thereof.

10. The aqueous carbon nanotube dispersion of claim 9, wherein the film former is present in the aqueous carbon nanotube dispersion in an amount of at least about 50 weight percent on a total solids basis.

11. The aqueous carbon nanotube dispersion of claim 9, wherein the film former is present in the aqueous carbon nanotube dispersion in an amount ranging from about 60 weight percent to about 80 weight percent on a total solids basis.

12. The aqueous carbon nanotube dispersion of claim 8, wherein the at least one additional component comprises a coupling agent, the coupling agent comprising one or more organosilanes.

13. The aqueous carbon nanotube dispersion of claim 12, wherein the one or more organosilanes comprise aminofunctional silanes, non-aminofunctional silanes or combinations thereof.

14. The aqueous carbon nanotube dispersion of claim 12, wherein the one or more organosilanes are present in the aqueous carbon nanotube dispersion in an amount up to about 10 weight percent on a total solids basis.

15. The aqueous carbon nanotube dispersion of claim 12, wherein the one or more organosilanes are present in the aqueous carbon nanotube dispersion in an amount ranging from about 1 weight percent to about 5 weight percent on a total solids basis.

16. A method of making an aqueous carbon nanotube dispersion comprising:
    providing a polymeric carrier;
    mixing carbon nanotube particles in an amount of at least about 1 weight percent on a total solid basis with the polymeric carrier, wherein the polymeric carrier comprising an aqueous dispersion of one or more polymeric species and wherein the carbon nanotube particles comprise a plurality of carbon nanotubes; and
    reducing the mixed carbon nanotube particles in size such that the carbon nanotube particles have a mean particle size that ranges from about 250 nm to about 2 μm;
    wherein the aqueous carbon nanotube dispersion has a viscosity of 1100 to 4500 cP at 5 RPM and 25° C.

17. The method of claim 16, wherein the carbon nanotube particles are mixed with the polymeric carrier in an amount ranging from about 1 weight percent to about 30 weight percent on a total solids basis.

18. The method of claim 16, wherein the carbon nanotube particles are mixed with the polymeric carrier in an amount ranging from about 1 weight percent to about 15 weight percent on a total solids basis.

19. The method of claim 16, wherein the one or more polymeric species comprises polyvinylpyrrolidone, polyurethane, epoxy or combinations thereof.

20. The method of claim 16, wherein the mixed carbon nanotube particles are reduced in size by milling.

21. The method of claim 16, further comprising providing at least one additional component and adding the at least one additional component to the aqueous carbon nanotube dispersion, the at least one additional component comprising a film former, coupling agent, lubricant, surfactant, biocide, antifoaming agent or mixtures thereof.

22. The method of claim 21, wherein the at least one additional component comprises a film former, the film former comprising polyurethane, epoxide, polyvinylpyrrolidone, polyacrylate, polyester, polyvinylacetate, polyvinyl alcohol or combinations thereof.

23. The method of claim 22, wherein the film former is present in the aqueous carbon nanotube dispersion in an amount of at least about 50 weight percent on a total solids basis.

24. The method claim 22, wherein the film former is present in the aqueous carbon nanotube dispersion in an amount ranging from about 60 weight percent to about 80 weight percent on a total solids basis.

25. The method of claim 21, wherein the at least one additional component comprises a coupling agent, the coupling agent comprises one or more organosilanes.

26. The method of claim 25, wherein the one or more organosilanes comprises aminofunctional silanes, non-aminofunctional silanes or combinations thereof.

27. The method of claim 25, wherein the one or more organosilanes are present in the aqueous carbon nanotube dispersion in an amount ranging from about 1 weight percent to about 5 weight percent on a total solids basis.

28. An aqueous carbon nanotube dispersion consisting essentially of:
carbon nanotube particles present in an amount of at least about 1 weight percent on a total solids basis, wherein the carbon nanotube particles comprise a plurality of carbon nanotubes and have a mean particle size that ranges from about 250 nm to about 2 µm; and
a polymeric carrier selected from the group consisting of a polyvinylpyrrolidone, a polyurethane, an epoxy, and combinations thereof;
wherein the aqueous carbon nanotube dispersion has a viscosity of 1100 to 4500 cP at 5 RPM and 25° C.

* * * * *